(12) United States Patent
Ikoma et al.

(10) Patent No.: US 9,805,285 B2
(45) Date of Patent: Oct. 31, 2017

(54) STATE ESTIMATION APPARATUS, STATE ESTIMATION METHOD, AND INTEGRATED CIRCUIT

(71) Applicants: MegaChips Corporation, Osaka-shi (JP); Kyushu Institute of Technology, Kitakyushu-shi (JP)

(72) Inventors: Norikazu Ikoma, Fukuoka (JP); Hiromu Hasegawa, Osaka (JP)

(73) Assignees: MegaChips Corporation, Osaka-shi (JP); Kyushu Institute of Technology, Kitakyushu-shi (JP)

( * ) Notice: Subject to any disclaimer, the term of this patent is extended or adjusted under 35 U.S.C. 154(b) by 0 days.

(21) Appl. No.: 15/355,532

(22) Filed: Nov. 18, 2016

(65) Prior Publication Data

US 2017/0069106 A1    Mar. 9, 2017

Related U.S. Application Data

(63) Continuation of application No. PCT/JP2015/062057, filed on Apr. 21, 2015.

(30) Foreign Application Priority Data

May 22, 2014 (JP) ................. 2014-106073

(51) Int. Cl.
   G06K 9/00 (2006.01)
   G06K 9/46 (2006.01)
   G06T 7/277 (2017.01)

(52) U.S. Cl.
   CPC ............ G06K 9/4671 (2013.01); G06T 7/277 (2017.01); G06T 2207/10004 (2013.01); G06T 2207/10016 (2013.01); G06T 2207/20076 (2013.01)

(58) Field of Classification Search
   None
   See application file for complete search history.

(56) References Cited

U.S. PATENT DOCUMENTS

| 7,035,764 | B2 * | 4/2006 | Rui | ........................ G06T 7/277 342/64 |
| 2005/0114079 | A1 * | 5/2005 | Rui | ........................ G06T 7/277 702/179 |

(Continued)

FOREIGN PATENT DOCUMENTS

| JP | 2008-262331 A | 10/2008 |
| JP | 2012-234466 A | 11/2012 |
| JP | 2014-081863 A | 5/2014 |

OTHER PUBLICATIONS

D. Smith and S. Singh, "Approaches to Multisensor Data Fusion in Target Tracking: A Survey," in IEEE Transactions on Knowledge and Data Engineering, vol. 18, No. 12, pp. 1696-1710, Dec. 2006. doi: 10.1109/TKDE.2006.183, Available online: URL: http://ieeexplore.ieee.org/stamp/stamp.jsp?tp=&arnumber=1717425&isnumber=36128.*

(Continued)

Primary Examiner — Tahmina Ansari
(74) Attorney, Agent, or Firm — Oblon, McClelland, Maier & Neustadt, L.L.P.

(57) ABSTRACT

Provided is a state estimation apparatus that enables more accurate and robust detection and tracking of an object by obtaining a plurality of sets of observation data for a tracking target object and estimating the internal state of the object using a plurality of likelihoods calculated from the obtained sets of observation data. The state estimation apparatus obtains first observation data and second observation data, each of which is composed of a plurality of pieces of observation data, and obtains possibility measurement data and necessity measurement data from the obtained plurality (Continued)

of pieces of observation data. In the state estimation apparatus, a likelihood obtaining unit obtains a first likelihood wp and a second likelihood wn from the possibility measurement data and the necessity measurement data. Using the obtained first likelihood wp and second likelihood wn enables the internal state of the object to be estimated.

14 Claims, 9 Drawing Sheets

(56) References Cited

U.S. PATENT DOCUMENTS

| | | | | |
|---|---|---|---|---|
| 2014/0114888 | A1* | 4/2014 | Noda | G06K 9/6256 706/12 |
| 2015/0278601 | A1* | 10/2015 | Nagamine | G06T 7/277 382/103 |
| 2016/0035098 | A1* | 2/2016 | Ikoma | G06T 7/20 382/103 |
| 2016/0171296 | A1* | 6/2016 | Ikenoue | G06K 9/6204 382/103 |
| 2017/0069106 | A1* | 3/2017 | Ikoma | G06T 7/00 |

OTHER PUBLICATIONS

Keiichi Sato, "An Experimental Study on Object Location in 3D Space with Particle Filter", The Institute of Electrical Engineers of Japan Kenkyukai Shiryo, Aug. 24, 2012, IP-12-19, IIS-12-61, pp. 27 to 30.

Written Opinion of the International Searching Authority dated May 26, 2015 for PCT/JP2015/062057 filed Apr. 21, 2015.

International Search Report dated May 26, 2015 for PCT/JP2015/062057 filed Apr. 21, 2015 (English Translation).

European Search Report dated Apr. 19, 2017 in Patent Application No. 15795830.7.

Office Action dated May 8, 2017 in European Patent Application No. 15 795 830.7.

* cited by examiner

STATE ESTIMATION APPARATUS, STATE ESTIMATION METHOD, AND INTEGRATED CIRCUIT

TECHNICAL FIELD

The present invention relates to a technique for estimating the state of an observable event using time-series filtering, and particularly to, for example, a technique for tracking objects in a moving image using time-series filtering.

BACKGROUND ART

Techniques for estimating the internal state of an observation target, changing from moment to moment, may use time-series filtering. Assuming that a state vector $x_t$ indicates the internal state of an object at time t and an observation vector $y_t$ indicates a feature observed at time t, time-series filtering is a technique for estimating an internal state $x_t$ of a directly unobservable object by using the observation vector $y_t$ obtained through observation.

More specifically, time-series filtering is a technique for determining a conditional probability distribution $p(x_t|y_{1:t})$ of a state series $x_{0:t}=\{x_0, x_1, \ldots x_t\}$ using the state space models below, when an observation series (a set of observation vectors before time t) $y_{1:t}=\{y_1, y_2, \ldots y_t\}$ is given.

System model: $x_t \sim f(x_t|x_{t-1})$
Observation model: $y_t \sim h(y_t|x_t)$ With a system noise $v_t$ and an observation noise $w_t$, the system model showing the internal state of an object and the observation model formed by observing the object can be expressed as follows:

the system model showing the internal state of an object:
$x_t = f(x_{t-1}, v_t)$ the observation model formed by observing the object:
$y_t = h(x_t, w_t)$ where $f(x_{t-1}, v_t)$ is a state transition function indicating a change in the state between time t−1 and time t, and $h(x_t, w_t)$ is an observation vector obtained in the state $x_t$. In this case, the one-step ahead prediction is written as the formula below.

Formula 1

$$p(x_t|y_{1:t-1}) = \int p(x_{t-1}|y_{1:t-1})f(x_t|x_{t-1})dx_{t-1} \quad (1)$$

Based on Bayes' theorem, the posterior probability distribution $p(x_t|y_{1:t})$ at time t is written as the formula below.

Formula 2

$$p(x_t|y_{1:t}) = \frac{h(y_t|x_t)p(x_t|y_{1:t-1})}{p(y_t|y_{1:t-1})} \quad (2)$$

In this formula, $h(y_t|x_t)$ is a likelihood (a probability for obtaining an observation vector $y_t$ in the state $x_t$), and $p(x_t|y_{1:t-1})$ is a predictive probability distribution.

One practical example of time-series filtering is particle filtering. Particle filters represent the distribution of probabilities of the internal state of an observation target as the distribution of particles, and use the distribution of posterior probabilities of the state at the current time step as the distribution of prior probabilities of the state at the next time step. With particle filtering, the likelihood is calculated by comparing a template observation estimated from the state of particles indicating the distribution of prior probabilities (a set of samples generated in accordance with the prior probability distribution) (predictive samples) with an actual image (an actual observation) obtained at the next time step.

Particle filtering estimates the posterior probability distribution of particles from the calculated likelihoods and the predictive probability distribution.

Particle filtering uses the above processing performed repeatedly at each subsequent time step to successively estimate the dynamically changing state of an observation target (e.g., a tracking target).

Particle filtering involves the processing (1) to (4) below, in which M is the number of particles (M is a natural number) and $1 \le i \le M$ (i is an integer).

(1) Generating Particles (One-Step Ahead Prediction)

For each sample (each particle), the processing corresponding to the formula below is performed to generate a predictive sample at time t. More specifically, the probability distribution (predictive probability distribution) predicted in accordance with the system model (state transition function) is obtained from the posterior probability distribution at time t−1 (the probability distribution of the internal state of an observation target at time t−1). In more detail, each predictive sample is generated from the corresponding sample (particle) at time t−1 through transition in accordance with the system model f.

$$xa_t^{(i)} \sim f(x_t|x_{t-1}^{(i)})$$

$$xa_t = \{xa_t^{(1)}, xa_t^{(2)}, xa_t^{(3)}, \ldots xa_t^{(M)}\}$$

where $xa_t$ is a predictive (estimated) vector of a state vector $x_t$ calculated by a state transition function $f(\ )$.

(2) Calculating Weights (Calculating Likelihoods)

For each predictive sample generated in processing (1), the processing corresponding to the formula below is performed to calculate a weight (likelihood). More specifically, the probability (likelihood) to obtain the observation vector yt is estimated in accordance with the observation model h.

$$wa_t^{(i)} \sim h(y_t|xa_t^{(i)})$$

$$wa_t = \{wa_t^{(1)}, wa_t^{(2)}, wa_t^{(3)}, \ldots wa_t^{(M)}\}$$

where $wa_t$ is a predictive (estimated) vector of a weight (likelihood) $w_t$ (a set of predictive likelihoods) calculated by a function $h(\ )$.

(3) Resampling

At the ratio proportional to the weight (likelihood) $wa_t^{(i)}$, M particles are sampled without changing the total number of the particles (the particle $xa_t(i)$ is sampled). The posterior probability distribution at time t (the probability distribution of the internal state of the observation target at time t) is obtained from the sampled M particles.

(4) The Time t is Incremented, and the Processing Returns to (1).

The posterior probability distribution obtained in processing (3) (the posterior probability distribution at time t) is used as the prior probability distribution at the next time step (time t+1).

As described above, particle filtering allows the estimation of parameters indicating the changing state of the observation target, changing from moment to moment, by repeatedly predicting the prior probability distribution of parameters indicating the state of the observation target and calculating the posterior probability distribution. Such particle filtering may be used in tracking the position of an object in a moving image. In tracking the position of an object with particle filtering, parameters indicating the state of a tracking target (an example of an observation target) may be, for example, parameters indicating the position of an object. Particle filtering includes comparing observations estimated from parameters indicating the position of the object (predictive samples) with actual observations (e.g., an image captured by a camera) to calculate likelihoods, and resampling particles based on the calculated likelihoods to obtain the posterior probability distribution of parameters indicating the state of the observation target (see, for example, Patent Literature 1: Japanese Unexamined Patent Publication No 2012-234466).

DISCLOSURE OF INVENTION

Technical Problem

The techniques known in the art use single observation data in tracking an object. When, for example, the environment for obtaining observation data changes, appropriate observation data may not be obtained in a stable manner with these techniques, and the internal state of an object may not be estimated appropriately. Further, the techniques for tracking an object using single observation data in tracking an object may have difficulties in detecting and tracking various objects in an appropriate manner.

In response to the above problems, it is an object of the present invention to provide a state estimation apparatus, a program, and an integrated circuit that enable more accurate and robust detection and tracking of an object by obtaining a plurality of sets of observation data for a tracking target object and estimating the internal state of the object using a plurality of likelihoods calculated from the obtained sets of observation data.

Solution to Problem

To solve the above problems, a first aspect of the invention provides a state estimation apparatus including a first observation obtaining unit, a second observation obtaining unit, a possibility measurement obtaining unit, a necessity measurement obtaining unit, a prediction unit, a likelihood obtaining unit, a posterior probability distribution estimation unit, and a prior probability distribution output unit.

The first observation obtaining unit obtains first observation data from an observable event at predetermined time intervals.

The second observation obtaining unit obtains second observation data from the observable event at predetermined time intervals.

The possibility measurement obtaining unit obtains possibility measurement data by performing addition processing or logical OR processing with the first observation data and the second observation data.

The necessity measurement obtaining unit obtains necessity measurement data by performing multiplication processing or logical AND processing with the first observation data and the second observation data.

The prediction unit performs prediction using posterior probability distribution data, which is probability distribution, obtained at a preceding time t−1, of an internal state of the observation target to obtain predictive probability distribution data, which is probability distribution of an internal state of the observation target at a current time t.

The likelihood obtaining unit obtains a first likelihood based on the predictive probability distribution data and the possibility measurement data and obtains a second likelihood based on the predictive probability distribution data and the necessity measurement data.

The posterior probability distribution estimation unit estimates, from the first likelihood and the predictive probability distribution data, posterior probability distribution data, which is probability distribution of the internal state of the observation target at the current time t.

The prior probability distribution output unit outputs prior probability distribution data based on the posterior probability distribution data estimated by the posterior probability distribution estimation unit as prior probability distribution data at a next time t+1.

The state estimation apparatus obtains first observation data and second observation data, each of which is composed of a plurality of pieces of observation data, and obtains possibility measurement data and necessity measurement data from the obtained plurality of pieces of observation data.

In the state estimation apparatus, a likelihood obtaining unit obtains a first likelihood wp and a second likelihood wn from the possibility measurement data and the necessity measurement data. Using the obtained first likelihood wp and second likelihood wn enables the internal state of the object to be estimated. Thus, the state estimation apparatus enables a detection process and a tracking process to be performed for various objects more accurately and robustly.

It should be noted that the term "time" includes time defined by intervals at which an observation target is sampled; for example, time t−1 represents a timing one-sampling-time previous to a timing of sampling at time t.

The time interval between the current time t and the next time t+1, or between the preceding time t−1 and the current time may be the time long enough to allow the posterior probability distribution estimation unit to obtain posterior probability distribution data corresponding to a unit image (e.g., one frame). The interval may be, for example, the time corresponding to one frame (one-frame time).

A second aspect of the present invention provides the state estimation apparatus of the first aspect of the present invention in which the posterior probability distribution estimation unit sets an internal variable of a particle sampled in accordance with the posterior probability distribution at the current time t such that the internal variable includes a value set based on the second likelihood obtained by the likelihood obtaining unit.

The state estimation apparatus obtains the posterior probability distribution (posterior probability distribution data) $S_{t|t}$ reflecting the first likelihood and the second likelihood. In other words, the state estimation apparatus obtains a plurality of pieces of observation data (possibility measurement data and necessity measurement data) and estimates the internal state of the object using a plurality of likelihoods (first likelihood wp and second likelihood wn) derived from the obtained plurality of pieces of observation data. This enables more accurate and robust detection and tracking of an object.

For example, each particle obtained in accordance with the posterior probability distribution data $S_{t|t}$ has an internal variable $wn_{t|t}^{(i)}$ taking over (reflecting) a second likelihood value wn. Thus, determining the position of each particle and the internal variable taking over (reflecting) the second likelihood value wn achieves various tracking processing and detection processing using the particle (the posterior probability distribution data reflecting the first likelihood and the second likelihood).

A third aspect of the present invention provides the state estimation apparatus of the second aspect of the present invention in which the posterior probability distribution estimation unit sets an internal variable of a particle sampled in accordance with the posterior probability distribution at the current time t such that the internal variable includes a value defined by $wn_{t|t}^{(i)}=wn$, where $S_{t|t}$ is the posterior probability distribution data, $wn_{t|t}^{(i)}$ is an internal variable of an i-th particle obtained in accordance with the posterior probability distribution data $S_{t|t}$, wn is the second likelihood, corresponding to the particle, that is obtained by the likelihood obtaining unit.

The state estimating apparatus obtains the posterior probability distribution (posterior probability distribution data) $S_{t|t}$ reflecting the first likelihood and the second likelihood. In other words, the state estimation apparatus obtains a plurality of pieces of observation data (possibility measurement data and necessity measurement data) and estimates the internal state of the object using a plurality of likelihoods (first likelihood wp and second likelihood wn) derived from the obtained plurality of pieces of observation data. This enables more accurate and robust detection and tracking of an object.

For example, each particle obtained in accordance with the posterior probability distribution data $S_{t|t}$ has an internal variable $wn_{t|t}^{(i)}$ taking over (reflecting) a second likelihood value wn. Thus, determining the position of each particle and the internal variable taking over (reflecting) the second likelihood value wn achieves various tracking processing and detection processing using the particle (the posterior probability distribution data reflecting the first likelihood and the second likelihood).

A fourth aspect of the present invention provides the state estimation apparatus of the second aspect of the present invention in which the posterior probability distribution estimation unit sets an internal variable of a particle sampled in accordance with the posterior probability distribution at the current time t such that the internal variable includes a value defined by $$wn_{t|t}^{(i)} = wp_{t|t}^{(i)} \times wn/wp$$
$$= (1/M1) \times wn/wp$$

where $S_{t|t}$ is the posterior probability distribution data, $wn_{t|t}^{(i)}$ is an internal variable of an i-th particle obtained in accordance with the posterior probability distribution data $S_{t|t}$, wp is the first likelihood, corresponding to the particle, that is obtained by the likelihood obtaining unit, wn is the second likelihood, corresponding to the particle, that is obtained by the likelihood obtaining unit, M1 (M1 is a natural number) is the number of particles sampled in accordance with the posterior probability distribution at the current time t, and $wp_{t|t}^{(i)}$ is an internal variable based on the first likelihood wp of the particle sampled in accordance with the posterior probability distribution at the current time t.

The state estimation apparatus obtains the posterior probability distribution (posterior probability distribution data) $S_{t|t}$ reflecting the first likelihood and the second likelihood. In other words, the state estimation apparatus obtains a plurality of pieces of observation data (possibility measurement data and necessity measurement data) and estimates the internal state of the object using a plurality of likelihoods (first likelihood wp and second likelihood wn) derived from the obtained plurality of pieces of observation data. This enables more accurate and robust detection and tracking of an object.

For example, each particle obtained in accordance with the posterior probability distribution data $S_{t|t}$ has an internal variable $wn_{t|t}^{(i)}$ taking over (reflecting) a ratio wn/wp of the second likelihood value wn to the first likelihood. Thus, determining the position of each particle and the internal variable taking over (reflecting) the second likelihood value wn achieves various tracking processing and detection processing using the particle (the posterior probability distribution data reflecting the first likelihood and the second likelihood).

Instead of the ratio wn/wp of the second likelihood wn to the first likelihood, a ratio wp/wn may be used in the state estimation apparatus.

A fifth aspect of the present invention provides the state estimation apparatus of the second aspect of the present invention in which the posterior probability distribution estimation unit sets an internal variable of a particle sampled in accordance with the posterior probability distribution at the current time t such that the internal variable includes a value defined by $$wn_{t|t}^{(i)} = wp_{t|t}^{(i)} - (wp - wn)$$
$$= (1/M1) - (wp - wn)$$

where $S_{t|t}$ is the posterior probability distribution data, $wn_{t|t}^{(i)}$ is an internal variable of an i-th particle obtained in accordance with the posterior probability distribution data $S_{t|t}$, wp is the first likelihood, corresponding to the particle, that is obtained by the likelihood obtaining unit, wn is the second likelihood, corresponding to the particle, that is obtained by the likelihood obtaining unit, M1 (M1 is a natural number) is the number of particles sampled in accordance with the posterior probability distribution at the current time t, and $wp_{t|t}^{(i)}$ is an internal variable based on the first likelihood wp of the particle sampled in accordance with the posterior probability distribution at the current time t.

The state estimation apparatus obtains the posterior probability distribution (posterior probability distribution data) $S_{t|t}$ reflecting the first likelihood and the second likelihood. In other words, the state estimation apparatus obtains a plurality of pieces of observation data (possibility measurement data and necessity measurement data) and estimates the internal state of the object using a plurality of likelihoods (first likelihood wp and second likelihood wn) derived from the obtained plurality of pieces of observation data. This enables more accurate and robust detection and tracking of an object.

For example, each particle obtained in accordance with the posterior probability distribution data $S_{t|t}$ has an internal variable $wn_{t|t}^{(i)}$ taking over (reflecting) a difference wp-wn between the second likelihood value wn ant the first likelihood. Thus, determining the position of each particle and the internal variable taking over (reflecting) the second likelihood value wn achieves various tracking processing and detection processing using the particle (the posterior probability distribution data reflecting the first likelihood and the second likelihood).

Instead of the difference wp-wn between the second likelihood wn and the first likelihood, a difference wn-wp may be used in the state estimation apparatus.

A sixth aspect of the present invention provides the state estimation apparatus of the second aspect of the present invention in which the posterior probability distribution estimation unit sets an internal variable of a particle sampled in accordance with the posterior probability distribution at the current time t such that the internal variable includes a value, which is defined by a function 1 of at least one variable of the three variables M1, wp, and wn, written as $$wn_{t|t}^{(i)} = \Phi(M1),$$

$$wn_{t|t}^{(i)} = \Phi(wp),$$

$$wn_{t|t}^{(i)} = \Phi(wn),$$

$$wn_{t|t}^{(i)} = \Phi(M1, wp),$$

$$wn_{t|t}^{(i)} = \Phi(M1, wn),$$

$$wn_{t|t}^{(i)} = \Phi(wp, wn), \text{ or}$$

$$wn_{t|t}^{(i)} = \Phi(M1, wp, wn),$$

where $S_{t|t}$ is the posterior probability distribution data, $wn_{t|t}^{(i)}$ is an internal variable of an i-th particle obtained in accordance with the posterior probability distribution data $S_{t|t}$, wp is the first likelihood, corresponding to the particle, that is obtained by the likelihood obtaining unit, wn is the second likelihood, corresponding to the particle, that is obtained by the likelihood obtaining unit, M1 (M1 is a natural number) is the number of particles sampled in accordance with the posterior probability distribution at the current time t, and $wp_{t|t}^{(i)}$ is an internal variable based on the first likelihood wp of the particle sampled in accordance with the posterior probability distribution at the current time t.

The state estimation apparatus obtains the posterior probability distribution (posterior probability distribution data) $S_{t|t}$ reflecting the first likelihood and the second likelihood. In the state estimation apparatus, the internal variable $wn_{t|t}^{(i)}$ of the second likelihood wn is defined by the function $\Phi$ of at least one of the three variables M1, wp, and wn, thereby allowing the internal state of an object to be estimated more accurately based on the second likelihood defined by various variables.

A seventh aspect of the present invention provides the state estimation apparatus of one of the second to sixth aspect of the present invention in which processing below is performed when processing for tracking an object is performed. The posterior probability distribution estimation unit determines, based on the first likelihood wp, whether to continue to perform the processing for tracking the object or to stop the processing for tracking the object, where $S_{t|t}$ is the posterior probability distribution data, $wn_{t|t}^{(i)}$ is an internal variable of an i-th particle obtained in accordance with the posterior probability distribution data $S_{t|t}$, wp is the first likelihood, corresponding to the particle, that is obtained by the likelihood obtaining unit, wn is the second likelihood, corresponding to the particle, that is obtained by the likelihood obtaining unit, M1 (M1 is a natural number) is the number of particles sampled in accordance with the posterior probability distribution at the current time t, and $wp_{t|t}^{(i)}$ is an internal variable based on the first likelihood wp of the particle sampled in accordance with the posterior probability distribution at the current time t.

This enables the state estimation apparatus to determine, based on the first likelihood wp, whether to continue to perform the processing for tracking the object or to stop the processing for tracking the object.

An eighth aspect of the present invention provides the state estimation apparatus of the seventh aspect of the present invention in which the posterior probability distribution estimation unit obtains an integrated value sum using the formula below:

Formula 3

$$\text{sum} = \sum_{j=1}^{N1} w_p^{(j)} \tag{3}$$

where $S_{t|t-1}$ is the predictive probability distribution data, and $wp^{(j)}$ is an internal variable of the first likelihood of j-th particle of N1 (N1 is a natural number) particles, which are obtained in accordance with the predictive probability distribution $S_{t|t-1}$ and are used for tracking the object, obtained by the likelihood obtaining unit, and (1) the posterior probability distribution estimation unit determines to stop the processing for tracking the object when the integrated value sum is less than a predetermined threshold value Th1, and (2) the posterior probability distribution estimation unit determines to continue to perform the processing for tracking the object when the integrated value sum is greater than or equal to the threshold value Th1.

This enables the state estimation apparatus to determine, based on the integrated value of the internal variable $wp^{(j)}$ of the first likelihood, whether to continue to perform the processing for tracking the object or to stop the processing for tracking the object.

A ninth aspect of the present invention provides the state estimation apparatus of the seventh aspect of the present invention in which the posterior probability distribution estimation unit obtains a maximum value of internal variables $wp^{(j)}$ of N1 (N1 is a natural number) first likelihoods as a maximum value wp_max, where $S_{t|t-1}$ is the predictive probability distribution data, and $wp^{(j)}$ is an internal variable of the first likelihood of j-th particle of N1 particles, which are obtained in accordance with the predictive probability distribution $S_{t|t-1}$ and are used for tracking the object, obtained by the likelihood obtaining unit. The posterior probability distribution estimation unit then performs processing below.

(1) The posterior probability distribution estimation unit determines to stop the processing for tracking the object when the maximum value wp_max is less than a predetermined threshold value Th2.

(2) The posterior probability distribution estimation unit determines to continue to perform the processing for tracking the object when the maximum value wp_max is greater than or equal to the threshold value Th2.

This enables the state estimation apparatus to determine, based on the maximum value of the internal variable $wp^{(j)}$ of the first likelihood, whether to continue to perform the processing for tracking the object or to stop the processing for tracking the object.

A tenth aspect of the present invention provides the state estimation apparatus of one of the second to sixth aspects of the present invention in which processing below is performed when processing for tracking an object is performed. The posterior probability distribution estimation unit obtains, based on the second likelihood wn, estimation resultant data for estimating an internal state of the object to be tracked, where $S_{t|t}$ is the posterior probability distribution data, $wn_{t|t}^{(i)}$ is an internal variable of an i-th particle obtained in accordance with the posterior probability distribution data $S_{t|t}$, wp is the first likelihood, corresponding to the particle, that is obtained by the likelihood obtaining unit, wn is the second likelihood, corresponding to the particle, that is obtained by the likelihood obtaining unit, M1 (M1 is a natural number) is the number of particles sampled in accordance with the posterior probability distribution at the current time t, and $wp_{t|t}^{(i)}$ is an internal variable based on the first likelihood wp of the particle sampled in accordance with the posterior probability distribution at the current time t.

This enables the state estimation apparatus to obtain, based on the second likelihood wn, the estimation resultant data for estimating the internal state of the object to be tracked.

A eleventh aspect of the present invention provides the state estimation apparatus of the tenth aspect of the present invention in which the posterior probability distribution estimation unit obtains, as the estimation resultant data, vector data $(X_t^{(i)}, Y_t^{(i)}, W_t^{(i)}, H_t^{(i)})$ of a particle whose internal variable $wn_{t|t}^{(i)}$ is maximum among M1 particles obtained in accordance with the posterior probability distribution data $S_{t|t}$, where $(X_t^{(i)}, Y_t^{(i)}, W_t^{(i)}, H_t^{(i)})$ is vector data for internal variables as to a position of the i-th particle obtained in accordance with the posterior probability distribution data $S_{t|t}$.

This state estimation apparatus obtains, as the estimation resultant data, vector data for a particle whose internal variable $wn_{t|t}^{(i)}$ is a maximum, thereby allowing the internal state of the object, which is to be tracked, to be estimated accurately with a small amount of computation. As a result, the state estimation apparatus performs processing for tracking an object accurately with a small amount of computation.

A twelfth aspect of the present invention provides the state estimation apparatus of the tenth aspect of the present invention in which the posterior probability distribution estimation unit obtains a weighted average value wgt of M1 internal variables $wn_{t|t}^{(i)}$ obtained in accordance with the posterior probability distribution data $S_{t|t}$ using formula below:

Formula 4

$$wgt = \frac{1}{M1} \sum_{i=1}^{M1} w_n^{(i)} \quad (4)$$

where $(X_t^{(i)}, Y_t^{(i)}, W_t^{(i)}, H_t^{(i)})$ is vector data for internal variables as to a position of the i-th particle obtained in accordance with the posterior probability distribution data $S_{t|t}$, and the posterior probability distribution estimation unit obtains, as the estimation resultant data, vector data (wgt× $X_t^{(i)}$, wgt×$Y_t^{(i)}$, wgt×$W_t^{(i)}$, wgt×$H_t^{(i)}$) obtained using the weighted average value wgt.

This enables the state estimation apparatus to accurately estimate the internal state of the object to be tracked using vector data, which is obtained using the weighted average value wgt. As a result, the state estimation apparatus performs processing for tracking an object accurately.

A thirteenth aspect of the present invention provides a program for causing a computer to execute a state estimation method for estimating an internal state of an observation target. The state estimation method includes a first observation obtaining step, a second observation obtaining step, a possibility measurement obtaining step, a necessity measurement obtaining step, a prediction step, a likelihood obtaining step, a posterior probability distribution estimation step, and a prior probability distribution output step.

The first observation obtaining step obtains first observation data from an observable event at predetermined time intervals.

The second observation obtaining step obtains second observation data from the observable event at predetermined time intervals.

The possibility measurement obtaining step obtains possibility measurement data by performing addition processing or logical OR processing with the first observation data and the second observation data.

The necessity measurement obtaining step obtains necessity measurement data by performing multiplication processing or logical AND processing with the first observation data and the second observation data.

The prediction step performs prediction using posterior probability distribution data, which is probability distribution, obtained at a preceding time t−1, of an internal state of the observation target to obtain predictive probability distribution data, which is probability distribution of an internal state of the observation target at a current time t.

The likelihood obtaining step obtains a first likelihood based on the predictive probability distribution data and the possibility measurement data and obtains a second likelihood based on the predictive probability distribution data and the necessity measurement data.

The posterior probability distribution estimation step estimates, from the first likelihood and the predictive probability distribution data, posterior probability distribution data, which is probability distribution of the internal state of the observation target at the current time t.

The prior probability distribution output step outputs prior probability distribution data based on the posterior probability distribution data estimated by the posterior probability distribution estimation step as prior probability distribution data at a next time t+1.

This achieves a program for causing a computer to execute the state estimation method having the same advantageous effects as the state estimation apparatus of the first aspect of the present invention.

A fourteenth aspect of the invention provides an integrated circuit for estimating an internal state of an observation target. The integrated circuit includes a state estimation apparatus including a first observation obtaining unit, a second observation obtaining unit, a possibility measurement obtaining unit, a necessity measurement obtaining unit, a prediction unit, a likelihood obtaining unit, a posterior probability distribution estimation unit, and a prior probability distribution output unit.

The first observation obtaining unit obtains first observation data from an observable event at predetermined time intervals.

The second observation obtaining unit obtains second observation data from the observable event at predetermined time intervals.

The possibility measurement obtaining unit obtains possibility measurement data by performing addition processing or logical OR processing with the first observation data and the second observation data.

The necessity measurement obtaining unit obtains necessity measurement data by performing multiplication processing or logical AND processing with the first observation data and the second observation data.

The prediction unit performs prediction using posterior probability distribution data, which is probability distribution, obtained at a preceding time t−1, of an internal state of the observation target to obtain predictive probability distribution data, which is probability distribution of an internal state of the observation target at a current time t.

The likelihood obtaining unit obtains a first likelihood based on the predictive probability distribution data and the possibility measurement data and obtains a second likelihood based on the predictive probability distribution data and the necessity measurement data.

The posterior probability distribution estimation unit estimates, from the first likelihood and the predictive probability distribution data, posterior probability distribution data, which is probability distribution of the internal state of the observation target at the current time t.

The prior probability distribution output unit outputs prior probability distribution data based on the posterior probability distribution data estimated by the posterior probability distribution estimation unit as prior probability distribution data at a next time t+1.

This achieves an integrated circuit having the same advantageous effects as the state estimation apparatus of the first aspect of the present invention.

Advantageous Effects

The present invention provides a state estimation apparatus, a program, and an integrated circuit that enable more accurate and robust detection and tracking of an object by obtaining a plurality of sets of observation data for a tracking target object and estimating the internal state of the object using a plurality of likelihoods calculated from the obtained sets of observation data.

DESCRIPTION OF THE PREFERRED EMBODIMENTS

First Embodiment

A first embodiment will now be described with reference to the drawings.

1.1 Structure of State Estimation Apparatus

Figure 1:
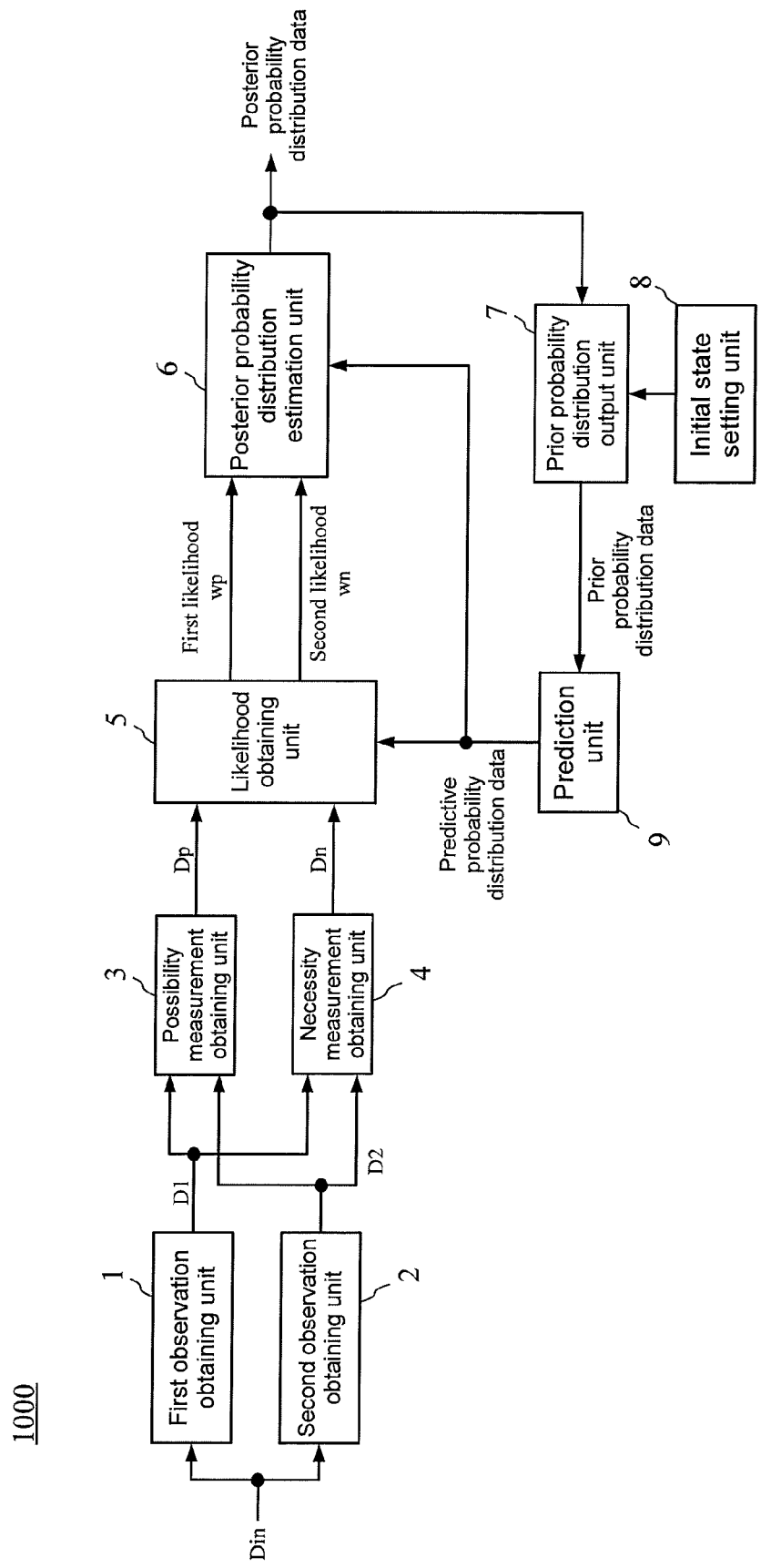
FIG. 1 is a schematic block diagram of a state estimation apparatus 1000 according to a first embodiment.

FIG. 1 is a schematic block diagram of a state estimation apparatus 1000 according to the first embodiment.

As shown in FIG. 1, the state estimation apparatus 1000 includes a first observation obtaining unit 1, a second observation obtaining unit 2, a possibility measurement obtaining unit 3, a necessity measurement obtaining unit 4, a likelihood obtaining unit 5, a posterior probability distribution estimation unit 6, a prior probability distribution output unit 7, an initial state setting unit 8, and a prediction unit 9.

The first observation obtaining unit 1 receives input data Din. The first observation obtaining unit 1 obtains first observation data D1 from the input data Din, and outputs the obtained first observation data D1 to the possibility measurement obtaining unit 3 and the necessity measurement obtaining unit 4. The first observation obtaining unit 1 receives, for example, an image (captured image) captured by an imaging apparatus as the input data Din, and obtains, as the first observation data, an extracted-feature image that is an image representing a predetermined image feature quantity extracted from the input data Din.

The second observation obtaining unit 2 receives the input data Din. The second observation obtaining unit 2 obtains second observation data D2 from the input data Din, and outputs the obtained second observation data D2 to the possibility measurement obtaining unit 3 and the necessity measurement obtaining unit 4. The second observation obtaining unit 2 receives, for example, an image (captured image) captured by an imaging apparatus as the input data Din, and obtains, as the second observation data, an extracted-feature image that is an image representing a predetermined image feature quantity extracted from the input data Din.

The possibility measurement obtaining unit 3 receives the first observation data D1 output from the first observation obtaining unit 1 and the second observation data D2 output from the second observation obtaining unit 2. The possibility measurement obtaining unit 3 adds the first observation data D1 and the second observation data D2 (or performs OR operation with the first observation data D1 and the second observation data D2) to obtain possibility measurement data Dp. The possibility measurement obtaining unit 3 outputs the obtained possibility measurement data Dp to the likelihood obtaining unit 5.

The necessity measurement obtaining unit 4 receives the first observation data D1 output from the first observation obtaining unit 1 and the second observation data D2 output from the second observation obtaining unit 2. The necessity measurement obtaining unit 4 multiplies the first observation data D1 and the second observation data D2 (or performs AND operation with the first observation data D1 and the second observation data D2) to obtain necessity measurement data Dn. The necessity measurement obtaining unit 4 outputs the obtained necessity measurement data Dn to the likelihood obtaining unit 5.

The likelihood obtaining unit 5 receives the possibility measurement data Dp output from the possibility measurement obtaining unit 3, the necessity measurement data Dn output from the necessity measurement obtaining unit 4, and predictive probability distribution data output from the prediction unit 9. The likelihood obtaining unit 5 obtains a first likelihood wp based on the predictive probability distribution data and the possibility measurement data Dp. The likelihood obtaining unit 5 also obtains a second likelihood wn based on the predictive probability distribution data and the necessity measurement data Dn. The likelihood obtaining unit 5 then outputs the obtained first likelihood wp and second likelihood wn to the posterior probability distribution estimation unit 6.

The posterior probability distribution estimation unit 6 receives the first likelihood wp and the second likelihood wn output from the likelihood obtaining unit 5 and the predictive probability distribution data output from the prediction unit 9. The posterior probability distribution estimation unit 6 estimates (obtains) a posterior probability distribution (posterior probability distribution data) based on the first likelihood wp, the second likelihood wn, and the predictive probability distribution data. The posterior probability distribution estimation unit 6 then outputs the estimated (obtained) posterior distribution (posterior probability distribution data) to the prior probability distribution output unit 7.

The prior probability distribution output unit 7 receives the setting data in an initial state, which is output from the initial state setting unit 8, and the posterior probability distribution (posterior probability distribution data) output from the posterior probability distribution estimation unit 6. In the initial state, the prior probability distribution output unit 7 generates a prior probability distribution (prior probability distribution data) based on the setting data in the initial state output from the initial state setting unit 8, and then outputs the generated prior probability distribution (prior probability distribution data) to the prediction unit 9.

In a state other than the initial state, the prior probability distribution output unit 7 outputs the posterior probability distribution (posterior probability distribution data) at time t, which is output from the posterior probability distribution estimation unit 6, to the prediction unit 9 as prior probability distribution (prior probability distribution data) at time t+1.

The initial state setting unit 8 stores data (initial values) for generating prior probability distribution in the initial state and outputs the data (initial values) to the prior probability distribution output unit 7.

The prediction unit 9 receives the prior probability distribution data transmitted from the prior probability distribution output unit 7. The prediction unit 9 obtains the probability distribution data predicted in accordance with the system model (state transition function) from the prior probability distribution data, which has been input to the prediction unit 9. The prediction unit 9 then outputs the obtained probability distribution data to the likelihood obtaining unit 5 and the posterior probability distribution estimation unit 6, as predicted probability distribution data.

1.2 Operation of State Estimation Apparatus

The operation of the state estimation apparatus 1000 with the above-described structure will now be described.

In the example described below, the input data Din is a moving image captured by an imaging apparatus (not shown) (captured moving image). The first observation data obtained by the first observation obtaining unit 1 is an extracted-feature image representing an area corresponding to a person extracted from the input data Din. The second observation data obtained by the second observation obtaining unit 2 is an extracted-feature image representing an area corresponding to a moving object extracted from the input data Din.

Figure 2:
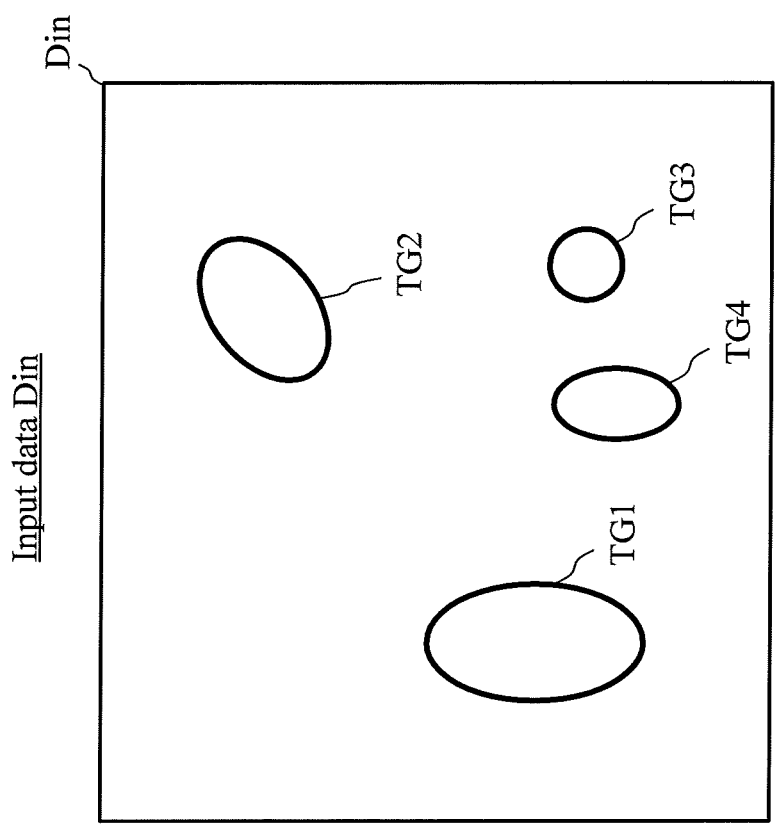
FIG. 2 is a schematic diagram showing input data Din, which is a moving image captured by an imaging apparatus (not shown) (captured moving image).

FIG. 2 is a schematic diagram showing the input data Din, which is a moving image captured by the imaging apparatus (not shown) (captured moving image).

Figure 3:
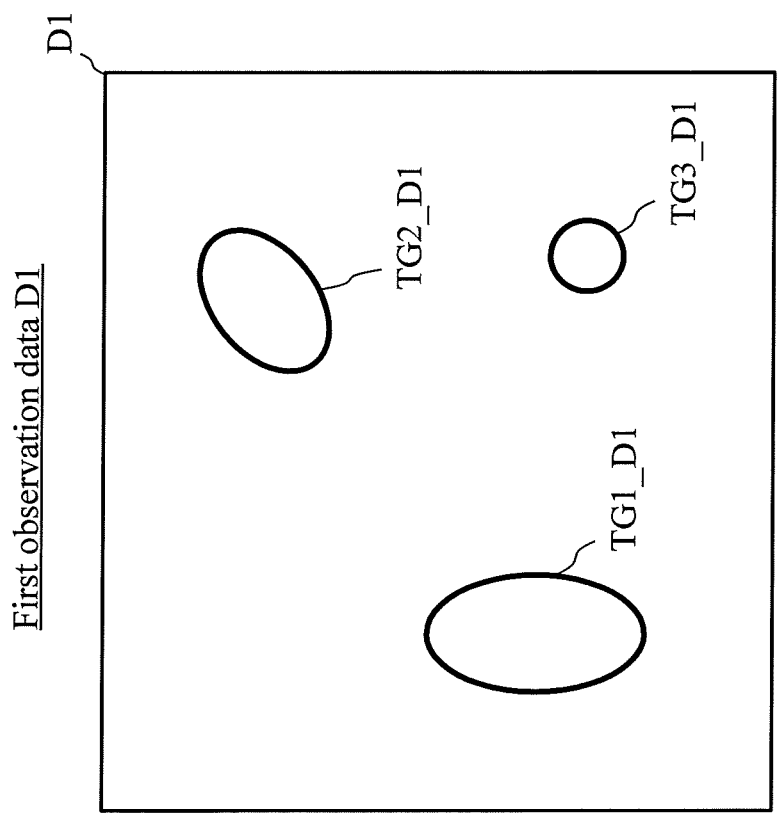
FIG. 3 is a schematic diagram showing first observation data D1 obtained by a first observation obtaining unit 1.

FIG. 3 is a schematic diagram showing the first observation data D1 obtained by the first observation obtaining unit 1.

Figure 4:
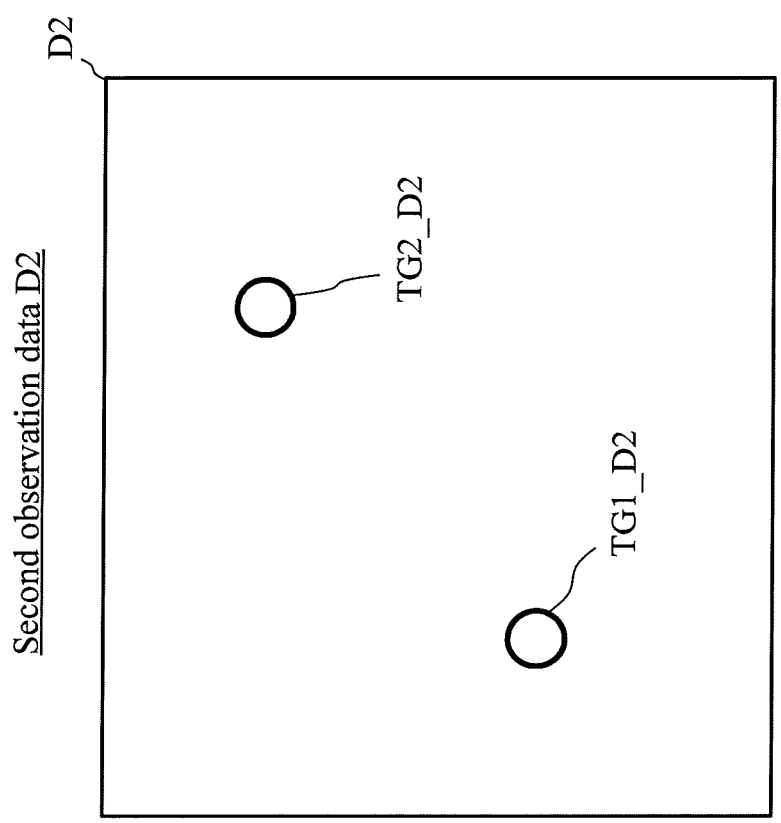
FIG. 4 is a schematic diagram showing second observation data D2 obtained by a second observation obtaining unit 2.

FIG. 4 is a schematic diagram showing the second observation data D2 obtained by the second observation obtaining unit 2.

At the current time (time t), the input data Din shown in FIG. 2 is input into the first observation obtaining unit 1 and the second observation obtaining unit 2.

As shown in FIG. 2, the input data Din at time t includes four objects TG1 to TG4. The objects TG1, TG2, and TG3 are persons, whereas the object TG4 is an object other than a person. The objects TG1 and TG2 are moving objects. More specifically, the objects TG1 and TG2 at the current time t (the time step of the current frame) have moved from the positions at the preceding time t−1 (the time step preceding time t by one frame) by at least a predetermined distance in the image.

The first observation obtaining unit 1 obtains the first observation data D1 by extracting image areas corresponding to persons from the input data Din. For example, the first observation obtaining unit 1 detects an image area corresponding to a person in the image formed using the input data Din by detecting an area containing much skin color component and/or by pattern matching for the shape of a person in the input data Din. The first observation obtaining unit 1 obtains the detected resultant image as the first observation data D1. In this manner, the first observation obtaining unit 1 obtains the first observation data D1 shown in FIG. 3. In FIG. 3, the areas detected from the first observation data D1 are image areas TG1_D1, TG2_D1, and TG3_D1 respectively corresponding to the objects TG1, TG2, and TG3, which are persons included in the input data Din. In the first observation data D1 (image D1) shown in FIG. 3, the pixels included in the image areas TG1_D1, TG2_D1, and TG3_D1 have pixel values other than 0, whereas the pixels included in image areas other than the image areas TG1_D1, TG2_D1, TG3_D1 have pixel values of 0.

The first observation data D1 obtained by the first observation obtaining unit 1 is output to the possibility measurement obtaining unit 3 and the necessity measurement obtaining unit 4.

The second observation obtaining unit 2 obtains the second observation data D2 by extracting image areas corresponding to moving objects from the input data Din. For example, the second observation obtaining unit 2 detects an image area corresponding to a moving object in the image formed using the input data Din by detecting the image area of an object that has moved in the image formed using the input data Din by at least a predetermined distance within one frame period (from the preceding time t−1 to the current time t). The second observation obtaining unit 2 obtains the detected resultant image as the second observation data D2. In this manner, the second observation obtaining unit 2 obtains the second observation data D2 shown in FIG. 4. FIG. 4 shows image areas TG1_D2 and TG2_D2 detected by the second observation obtaining unit 2, which detects the image areas of the objects that have moved in the image formed using the input data Din by at least a predetermined distance within one frame period (from the preceding time t−1 to the current time t) as circular areas having a predetermined radius and centered on the gravity center of the corresponding objects at time t. In FIG. 4, the areas detected from the second observation data D2 are image areas TG1_D2 and TG2_D2, which respectively correspond to the moving objects TG1 and TG2 in the input data Din. In the second observation data D2 (image D2) shown in FIG. 4, the pixels included in the image areas TG1_D2 and TG2_D2 have pixel values other than 0, whereas the pixels included in the image areas other than the image areas TG1_D2 and TG2_D2 have pixel values of 0.

The second observation data D2 obtained by the second observation obtaining unit 2 is output to the possibility measurement obtaining unit 3 and the necessity measurement obtaining unit 4.

The possibility measurement obtaining unit 3 obtains possibility measurement data Dp from the first observation data D1 and the second observation data D2. The possibility measurement obtaining unit 3 performs (1) addition processing with the first observation data D1 and the second observation data D2 or (2) logical OR operation processing with the first observation data D1 and the second observation data D2 to obtain the possibility measurement data Dp. The addition processing and the logical OR operation processing will be described below.

(1) Addition Processing

The possibility measurement obtaining unit 3 adds a pixel value of a pixel at a coordinate in the first observation data D1 (image D1) with a pixel value of a pixel at the same coordinate as that of the pixel in the image D1 in the second observation data D2 (image D2) to obtain a pixel value of a pixel at the coordinate in the possibility measurement data Dp. The possibility measurement obtaining unit 3 obtains a pixel value of a pixel at a coordinate (x1, y1) in the possibility measurement data Dp (image Dp) through the calculation with the following formula:

$$Dp(x1,y1)=D1(x1,y1)D2(x1,y1)$$

where D1(x1, y1) is a pixel value of a pixel at a coordinate (x1, y1) in the first observation data D1 (image D1), D2(x1, y1) is a pixel value of a pixel at a coordinate (x1, y1) in the second observation data D2 (image D2), and Dp(x1, y1) is a pixel value of a pixel at a coordinate (x1, y1) in the possibility measure data Dp (image Dp). Note that processing for limiting Dp(x1, y1) with an upper limit value and/or a lower limit value may be performed such that Dp(x1, y1) falls within a predetermined dynamic range (e.g., a dynamic range from 0 to 255 inclusive). Furthermore, processing for normalizing Dp(x1, y1) may be performed such that a dynamic range of Dp(x1, y1) falls within a predetermined range (e.g., a range from 0 to 255 inclusive or a range from 0 to 1 inclusive).

Through the above-described addition processing for all pixels in the image, the possibility measurement obtaining unit 3 obtains pixel values of all pixels included in the possibility measurement data Dp (image Dp). In this way, the possibility measurement obtaining unit 3 obtains the possibility measurement data Dp (image Dp).

Figure 5:
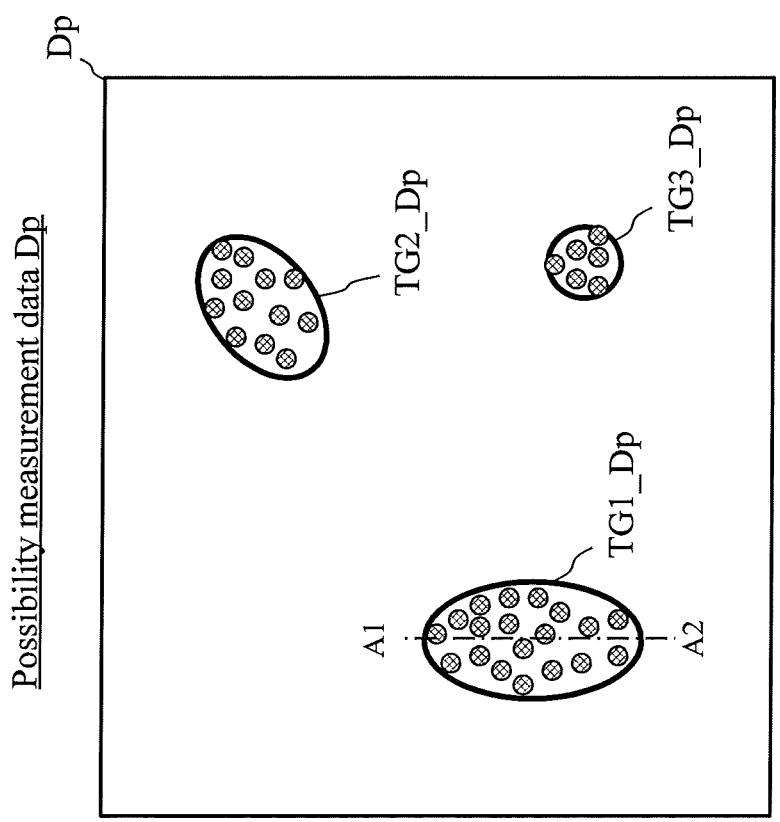
FIG. 5 is a diagram showing possibility measurement data Dp (image Dp) obtained from the first observation data D1 (image D1) shown in FIG. 3 and the second observation data D2 (image D2) shown in FIG. 4.

FIG. 5 is a diagram showing possibility measurement data Dp (image Dp) obtained from the first observation data D1 (image D1) shown in FIG. 3 and the second observation data D2 (image D2) shown in FIG. 4. FIG. 5 is a schematic diagram showing particles (one example) used for detecting (tracking) an object.

As shown in FIG. 5, image areas TG1_Dp, TG2_Dp, and TG3_Dp respectively corresponding to the objects TG1_D1, TG2_D1, and TG3_D1 in the first observation data D1 (image D1) are detected in the possibility measurement data Dp (image Dp). In the possibility measurement data Dp (image Dp), pixels included in the areas TG1_Dp, TG2_Dp, and TG3_Dp have pixel values other than 0, whereas pixels not included in the areas TG1_Dp, TG2_Dp, and TG3_Dp have pixel values of 0.

(2) Logical OR Operation Processing

The possibility measurement obtaining unit 3 performs binarization processing on the first observation data D1 (image D1) with a predetermined threshold value, and also performs binarization processing on the second observation data D2 (image D2) with a predetermined threshold value. The possibility measurement obtaining unit 3 performs an OR operation of a pixel value of a pixel in the binarized first observation data D1 (binarized image D1) and a pixel value of a pixel at the same coordinate as that of the pixel in the binarized image D1 in the binarized second observation data D2 (binarized image D2) to obtain a pixel value of a pixel at the coordinate in the possibility measurement data Dp. The possibility measurement obtaining unit 3 obtains a pixel value of a pixel at a coordinate (x1, y1) in the possibility measurement data Dp (image Dp) through the calculation with the following formula:

$$Dp(x1,y1)=D1(x1,y1)|D2(x1,y1)$$

where D1(x1, y1) is a pixel value of a pixel at a coordinate (x1, y1) in the binarized first observation data D1 (binarized image D1), D2(x1, y1) is a pixel value of a pixel at a coordinate (x1, y1) in the binarized second observation data D2 (binarized image D2), and Dp(x1, y1) is a pixel value of a pixel at a coordinate (x1, y1) in the possibility measure data Dp (image Dp). Note that the notation "|" denotes an operator calculating a logical OR operation.

Through the above-described logical OR operation processing for all pixels in the image, the possibility measurement obtaining unit 3 obtains pixel values of all pixels included in the possibility measurement data Dp (image Dp). In this way, the possibility measurement obtaining unit 3 obtains the possibility measurement data Dp (image Dp).

FIG. 5 shows the image Dp obtained through the above-described logical OR operation processing using the first observation data D1 (image D1) in FIG. 3 and the second observation data D2 (image D2) in FIG. 4. In the possibility measurement data Dp (image Dp) obtained through the logical OR operation processing, the pixels included in the image areas TG1_Dp, TG2_Dp, and TG3_Dp have pixel values 1 (a logical truth value), whereas the pixels included in image areas other than the image areas TG1_Dp, TG2_Dp, TG3_Dp have pixel values of 0. Note that the pixels included in the image areas TG1_Dp, TG2_Dp, and TG3_Dp may have pixel values indicating a logical truth value; for example, the pixels included in the image areas TG1_Dp, TG2_Dp, and TG3_Dp may have pixel values of 255 when pixel values are 8-bit data ranging from 0 through 255.

The possibility measurement data Dp obtained by the possibility measurement obtaining unit 3 through the above-described "(1) addition processing" or "(2) logical OR operation processing" is output to the likelihood obtaining unit 5.

The necessity measurement obtaining unit 4 obtains necessity measurement data Dn from the first observation data D1 and the second observation data D2. The necessity measurement obtaining unit 4 performs (1) multiplication processing with the first observation data D1 and the second observation data D2 or (2) logical AND operation processing with the first observation data D1 and the second observation data D2 to obtain the necessity measurement data Dn. The multiplication processing and the logical AND operation processing will be described below.

(1) Multiplication Processing

The necessity measurement obtaining unit 4 multiplies a pixel value of a pixel at a coordinate in the first observation data D1 (image D1) by a pixel value of a pixel at the same coordinate as that of the pixel in the image D1 in the second observation data D2 (image D2) to obtain a pixel value of a pixel at the coordinate in the necessity measurement data Dn. The necessity measurement obtaining unit 4 obtains a pixel value of a pixel at a coordinate (x1, y1) in the necessity measurement data Dn (image Dn) through the calculation with the following formula:

$$Dp(x1,y1)=D1(x1,y1) \times D2(x1,y1)$$

where D1(x1, y1) is a pixel value of a pixel at a coordinate (x1, y1) in the first observation data D1 (image D1), D2(x1, y1) is a pixel value of a pixel at a coordinate (x1, y1) in the second observation data D2 (image D2), and Dn(x1, y1) is a pixel value of a pixel at a coordinate (x1, y1) in the necessity measure data Dn (image Dn). Note that processing for limiting Dn(x1, y1) with an upper limit value and/or a lower limit value may be performed such that Dn(x1, y1) falls within a predetermined dynamic range (e.g., a dynamic range from 0 to 255 inclusive). Furthermore, processing for normalizing Dn(x1, y1) may be performed such that a dynamic range of Dn(x1, y1) falls within a predetermined range (e.g., a range from 0 to 255 inclusive or a range from 0 to 1 inclusive).

Through the above-described multiplication processing for all pixels in the image, the necessity measurement obtaining unit 4 obtains pixel values of all pixels included in the necessity measurement data Dn (image Dn). In this way, the necessity measurement obtaining unit 4 obtains the necessity measurement data Dn (image Dn).

Figure 6:
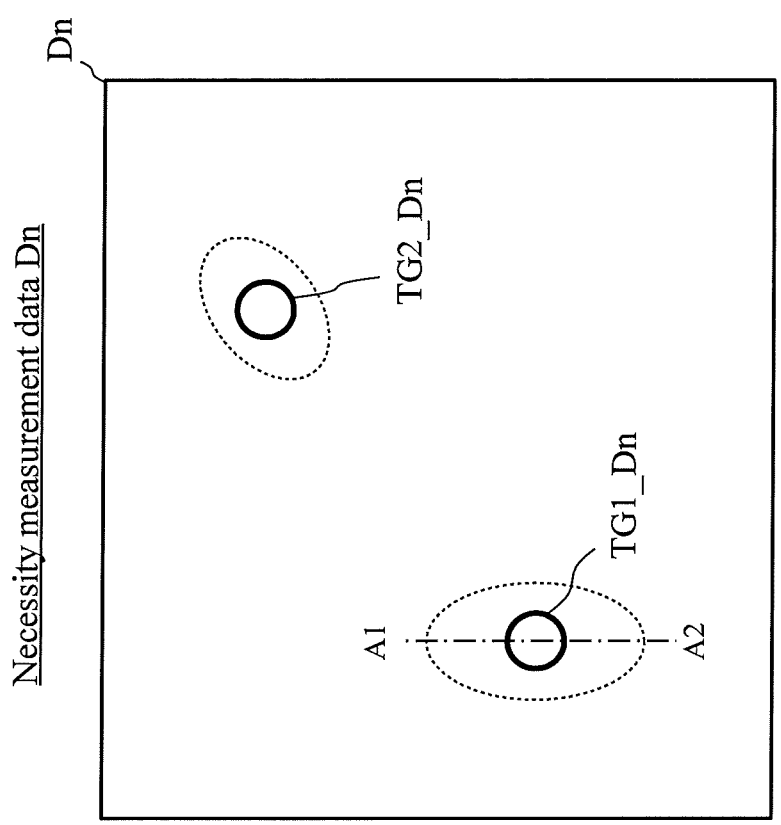
FIG. 6 is a diagram showing necessity measurement data Dn (image Dn) obtained from the first observation data D1 (image D1) shown in FIG. 3 and the second observation data D2 (image D2) shown in FIG. 4.

FIG. 6 is a diagram showing necessity measurement data Dn (image Dn) obtained from the first observation data D1 (image D1) shown in FIG. 3 and the second observation data D2 (image D2) shown in FIG. 4.

As shown in FIG. 6, image areas TG1_Dn and TG2_Dn respectively corresponding to the objects TG1_D2 and TG2_D2 in the second observation data D2 (image D2) are detected in the necessity measurement data Dn (image Dn). In the necessity measurement data Dn (image Dn), pixels included in the areas TG1_Dn and TG2_Dn have pixel values other than 0, whereas pixels not included in the areas TG1_Dn and TG2_Dn have pixel values of 0.

(2) Logical AND Operation Processing

The necessity measurement obtaining unit 4 performs binarization processing on the first observation data D1 (image D1) with a predetermined threshold value, and also performs binarization processing on the second observation data D2 (image D2) with a predetermined threshold value. The necessity measurement obtaining unit 4 performs an AND operation of a pixel value of a pixel in the binarized first observation data D1 (binarized image D1) and a pixel value of a pixel at the same coordinate as that of the pixel in the binarized image D1 in the binarized second observation data D2 (binarized image D2) to obtain a pixel value of a pixel at the coordinate in the necessity measurement data Dn. The necessity measurement obtaining unit 4 obtains a pixel value of a pixel at a coordinate (x1, y1) in the necessity measurement data Dn (image Dn) through the calculation with the following formula:

Dp(x1, y1)=D1(x1, y1) & D2(x1, y1) where D1(x1, y1) is a pixel value of a pixel at a coordinate (x1, y1) in the binarized first observation data D1 (binarized image D1), D2(x1, y1) is a pixel value of a pixel at a coordinate (x1, y1) in the binarized second observation data D2 (binarized image D2), and Dp(x1, y1) is a pixel value of a pixel at a coordinate (x1, y1) in the necessity measure data Dn (image Dn). Note that the notation "&" denotes an operator calculating a logical AND operation.

Through the above-described logical AND operation processing for all pixels in the image, the necessity measurement obtaining unit 4 obtains pixel values of all pixels included in the necessity measurement data Dn (image Dn). In this way, the necessity measurement obtaining unit 4 obtains the necessity measurement data Dn (image Dn).

FIG. 6 shows the image Dn obtained through the above-described logical AND operation processing using the first observation data D1 (image D1) in FIG. 3 and the second observation data D2 (image D2) in FIG. 4. In the necessity measurement data Dn (image Dn) obtained through the logical AND operation processing, the pixels included in the image areas TG1_Dn and TG2_Dn have pixel values 1 (a logical truth value), whereas the pixels included in image areas other than the image areas TG1_Dn and TG2_Dn have pixel values of 0. Note that the pixels included in the image areas TG1_Dn and TG2_Dn may have pixel values indicating a logical truth value; for example, the pixels included in the image areas TG1_Dn and TG2_Dn may have pixel values of 255 when pixel values are 8-bit data ranging from 0 through 255.

The necessity measurement data Dn obtained by the necessity measurement obtaining unit 4 through the above-described "(1) multiplication processing" or "(2) logical and operation processing" is output to the likelihood obtaining unit 5.

A state vector indicating the internal state of a target to be observed (a target to be tracked) at time t is assumed to be $x_t$. A feature observed at time t is assumed to be an observation vector $y_t$. A set of samples (a set of particles) $S_{t|t-1}$ generated in accordance with predictive probability distribution $p(x_t|y_{t-1})$ is assumed to be $S_{t|t-1}=\{s_{t|t-1}^{(1)}, s_{t|t-1}^{(2)}, \ldots, s_{t|t-1}^{(M)}\}$. A set of samples (a set of particles) $S_{t|t}$ generated in accordance with posterior probability distribution $p(x_t|y_t)$ is assumed to be $S_{t|t}=\{s_{t|t}^{(1)}, s_{t|t}^{(2)}, \ldots, s_{t|t}^{(M)}\}$.

Also, the i-th sample (particle) $s_{t|t}^{(i)}$ in the set of samples (the set of particles) $S_{t|t}$ is vector data having, as its internal variables, the coordinate position $(X_t^{(i)}, Y_t^{(i)})$ of the i-th sample (particle) in the image, the width $W_t$ and height $H_t$ of the rectangular image area centered on the coordinate position $(X_t^{(i)}, Y_t^{(i)})$, a first likelihood $wp_t^{(i)}$, and a second likelihood $wn_t^{(i)}$. In other words, the sample (particle) $s_{t|t-1}^{(i)}$ satisfies $s_{t|t}^{(i)}=(X_t^{(i)}, Y_t^{(i)}, W_t^{(i)}, H_t^{(i)}, wn_t^{(i)}, wp_t^{(i)})$.

For multiple observation targets (tracking targets), each observation target is given an object number, and the set of samples (the set of particles) $S_{t|t-1}$ generated in accordance with the predictive probability distribution and the set of samples (the set of particles) $S_{t|t}$ generated in accordance with the posterior probability distribution are set for each observation target in the same manner as described above.

For ease of explanation, the observation target (tracking target) is the object TG1 in the example described below.

The prediction unit 9 performs prediction processing.

In detail, the prediction unit 9 performs prediction processing based on the set of particles $S_{t-1|t-1}$ generated by the prior probability distribution output unit 7 in accordance with the prior probability distribution (prior probability distribution data) at time t−1. This prediction process generates the set of particles $S_{t|t-1}$.

In one example, Gaussian noise using the dynamics of random walks as the underlying assumption is added to the state of each particle included in the set of particles $S_{t|t-1}$ (this is referred to as "prior probability distribution $S_{t|t-1}$") generated in accordance with the prior probability distribution (prior probability distribution data) of parameters representing a state of the target object TG1 at time t−1, thereby obtaining a set of particles $S_{t|t-1}$ (this is referred to as "predictive probability distribution $S_{t|t-1}$") after prediction processing. More specifically, the prediction unit 9 obtains the set of particles $S_{t|t-1}$ resulting from the prediction using the following formula: $s_{t|t-1}^{(i)} = f(s_{t-1|t-1}^{(i)}, v_t^{(i)})$ where $v_t^{(i)}$ is system noise in accordance with the Gaussian distribution, f( ) is a state transition function indicating a change in the states between time t−1 and time t, and $v_t^{(i)}$ is system noise.

In more detail, the internal state of the i-th particle in accordance with the prior probability distribution (prior probability distribution data) at time t−1 is $(X_{t-1|t-1}^{(i)}, Y_{t-1|t-1}^{(i)}, W_{t-1|t-1}^{(i)}, H_{t-1|t-1}^{(i)}, wn_{t-1|t-1}^{(i)}, wp_{t-1|t-1}^{(i)})$, and the internal state of the i-th particle resulting from the prediction processing is $(X_{t|t-1}^{(i)}, Y_{t|t-1}^{(i)}, W_{t|t-1}^{(i)}, H_{t|t-1}^{(i)}, wn_{t|t-1}^{(i)}, wp_{t|t-1}^{(i)})$. Thus, the prediction unit 9 obtains the set of particles $s_{t|t-1}$ resulting from the prediction as $X_{t-1|t-1}^{(i)} = X_{t-1|t-1}^{(i)} + \Delta X^{(i)}$, $Y_{t-1|t}^{(i)} = Y_{t-1|t-1}^{(i)} + \Delta Y^{(i)}$, $W_{t-1|t}^{(i)} = W_{t-1|t-1}^{(i)} + \Delta W^{(i)}$, and $H_{t-1|t}^{(i)} = H_{t-1|t-1}^{(i)} + \Delta H^{(i)}$, where $\Delta X^{(i)}$, $\Delta Y^{(i)}$, $\Delta W^{(i)}$, and $\Delta H^{(i)}$ are in accordance with the Gaussian distribution.

The set of particles $S_{t|t-1}$ for the object TG1 resulting from the prediction is then output from the prediction unit 9 to the likelihood obtaining unit 5 as the predictive probability distribution data.

The likelihood obtaining unit 5 obtains the first likelihood wp based on the predictive probability distribution data obtained by the prediction unit 9 and the possibility measurement data Dp. The likelihood obtaining unit 5 obtains the second likelihood wn based on the predictive probability distribution data obtained by the prediction unit 9 and the necessity measurement data Dn.

Figure 7:
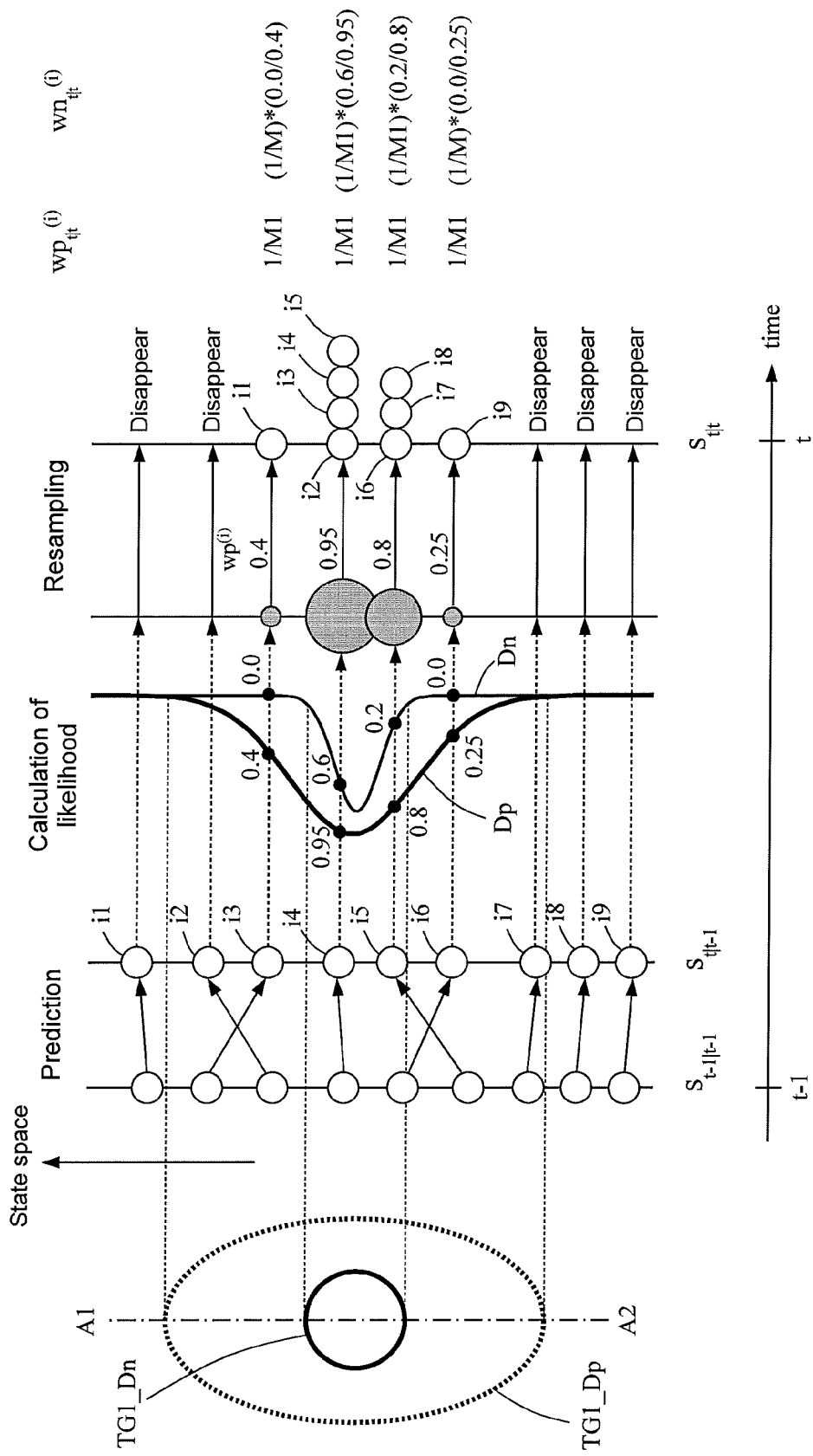
FIG. 7 is a diagram describing a predicting process, a likelihood obtaining process, and a resampling process for an object TG1 as an observation target (tracking target).

FIG. 7 is a diagram describing a predicting process, a likelihood obtaining process, and a resampling process for an object TG1 as an observation target (tracking target). FIG. 7 schematically illustrates particles only with respect to the vertical direction (Y-axis direction). In more detail, FIG. 7 is a schematic diagram showing particles disposed on straight line A1-A2 in the vertical direction in FIGS. 5 and 6. FIG. 7 also shows curve Dp indicating the values of the possibility measurement data (the pixel values of the image Dp) along straight line A1-A2 and curve Dn indicating the values of the necessity measurement data Dn (the pixel values of the image Dn) along straight line A1-A2. In FIG. 7, the curves Dp and Dn indicate larger pixel values (values in the positive direction) toward the left.

1.2.1 Obtaining First Likelihood wp

The likelihood obtaining unit 5 calculates the first likelihood wp using the predictive probability distribution data $S_{t|t-1}$ output from the prefer unit 9 and the possibility measurement data Dp (image Dp).

As shown in FIG. 7, the prediction unit 9 performs prediction using the set of particles $S_{t-1|t-1}$ generated in accordance with the prior probability distribution at time t (the posterior probability distribution of time t−1) to obtain the predictive probability distribution data $S_{t|t-1}$.

The likelihood obtaining unit 5 integrates the values of the possibility measurement data Dp (image Dp) included in the image area occupied by each particle obtained in accordance with the predictive probability distribution data $S_{t|t-1}$ (the pixel values of pixels included in the image area occupied by each particle in the image Dp), and uses the integrated value as the first likelihood wp. The likelihood for each particle is indicted by a dot in FIG. 7. A larger dot indicates a greater likelihood.

In the image Dp, the i-th particle resulting from the prediction has an internal state of $(X_{t|t-1}^{(i)}, Y_{t|t-1}^{(i)}, W_{t|t-1}^{(i)}, H_{t|t-1}^{(i)}, wn_{t|t-1}^{(i)}, wp_{t|t-1}^{(i)})$, occupied by this particle is a rectangular area centered on the coordinates $(X_{t|t-1}^{(i)}, Y_{t|t-1}^{(i)})$, and having the width (the length in the horizontal direction) $W_{t|t-1}^{(i)}$ and the height (the length in the vertical direction) $H_{t|t-1}^{(i)}$.

The values of the possibility measurement data Dp (image Dp) and the values of the necessity measurement data Dn (image Dn) in FIG. 7 are each normalized data (values) ranging from 0 to 1.

In FIG. 7, particle numbers i1 to i9 are assigned to the particles obtained in accordance with the predictive probability distribution data $S_{t|t-1}$. When $wp^{(i)}$ is the first likelihood value of the i-th particle, the first likelihood values $wp^{(i1)}$, $wp^{(i2)}$, $wp^{(i7)}$, $wp^{(i8)}$, and $wp^{(i9)}$ are 0.

The first likelihood values of the i3-rd to i6-th particles are as follows:

$wp^{(i3)} = 0.4$ $wp^{(i4)} = 0.95$ $wp^{(i5)} = 0.8$ $wp^{(i6)} = 0.25$ 1.2.2 Obtaining Second Likelihood wn The likelihood obtaining unit 5 calculates the second likelihood wn using the predictive probability distribution data $S_{t|t-1}$ output from the prefer unit 9 and the necessity measurement data Dn (image Dn).

As shown in FIG. 7, the prediction unit 9 performs prediction using the set of particles $S_{t-1|t-1}$ generated in accordance with the prior probability distribution at time t (the posterior probability distribution of time t−1) to obtain the predictive probability distribution data $S_{t|t-1}$.

The likelihood obtaining unit 5 integrates the values of the necessity measurement data Dn (image Dn) included in the image area occupied by each particle obtained in accordance with the predictive probability distribution data $S_{t|t-1}$ (the pixel values of pixels included in the image area occupied by each particle in the image Dn), and uses the integrated value as the second likelihood wn.

In the image Dn, the i-th particle resulting from the prediction has an internal state of $(X_{t|t-1}^{(i)}, Y_{t|t-1}^{(i)}, W_{t|t-1}^{(i)}, H_{t|t-1}^{(i)}, wn_{t|t-1}^{(i)}, wp_{t|t-1}^{(i)})$, and thus the image area occupied by this particle is a rectangular area centered on the coordinates $(X_{t|t-1}^{(i)}, Y_{t|t-1}^{(i)})$ and having the width (the length in the horizontal direction) $W_{t|t-1}^{(i)}$ and the height (the length in the vertical direction) $H_{t|t-1}^{(i)}$.

The values of the necessity measurement data Dn (image Dn) in FIG. 7 are normalized data (values) ranging from 0 to 1.

In FIG. 7, particle numbers i1 to i9 are assigned to the particles obtained in accordance with the predictive probability distribution data $S_{t|t-1}$. When $wn^{(i)}$ is the second likelihood value of the i-th particle, the second likelihood values $wn^{(i1)}$, $wn^{(i2)}$, $wn^{(i3)}$, $wn^{(i6)}$, $wn^{(i7)}$, $wp^{(i8)}$, and $wp^{(i9)}$ are 0.

The second likelihood values of the i4-th to i5-th particles are as follows:

$wn^{(i4)} = 0.6$ $wn^{(i5)} = 0.2$

The first likelihood vale wp and the second likelihood value wn for each particle in accordance with predictive probability distribution $S_{t|t-1}$ are output from the likelihood obtaining unit 5 to the posterior probability distribution estimation unit 6.

The posterior probability distribution estimation unit 6 estimates (obtains) posterior probability distribution (posterior probability distribution data) based on the first likelihood wp and the second likelihood wn.

The posterior probability distribution estimation unit 6 samples M1 particles, at the ratio proportional to the first likelihood w2p$^{(i)}$ of the target object TG1 at time t, without changing the total number of the particles (the particle xa$_t^{(i)}$ (i-th particle of the object TG1) is sampled). In this case, the posterior probability distribution estimation unit 6 takes over the second likelihood wn with the sampled particles. In other words, the posterior probability distribution estimation unit 6 sets the second likelihood wn obtained by the likelihood obtaining unit 5 to the internal variable wn$^{(i)}$ of $S_{t|t}^{(i)}$.

In the example shown in FIG. 7, nine particles are sampled on straight line A1-A2 included in the image area TG1_Dp.

The i3-rd particle obtained in accordance with the predictive probability distribution data $S_{t|t-1}$ is used to obtain the first likelihood wp$^{(i3)}$ of 0.4. Based on the proportional distribution, one particle is sampled at the position of the i3-rd particle obtained in accordance with the predictive probability distribution data $S_{t|t-1}$. More specifically, the i1-st particle obtained in accordance with the posterior probability distribution data $S_{t|t}$ is sampled.

The second likelihood wn$^{(i3)}$=0.0 is then obtained from the i3-rd particle obtained in accordance with the predictive probability distribution $S_{t|t-1}$. Thus, the internal variable wn$^{(i1)}$ of i1-st particle obtained in accordance with the posterior probability distribution $S_{t|t}$ is set to the second likelihood wn=0.0, which is obtained by the likelihood obtaining unit 5. More specifically, the internal variables of the i1-st particle obtained in accordance with the posterior probability distribution data $S_{t|t}$ are set as follows:

$$(X_{t|t}^{(i1)}, Y_{t|t}^{(i1)}, W_{t|t}^{(i1)}, H_{t|t}^{(i1)}, wn_{t|t}^{(i1)}, wp_{t|t}^{(i1)}) = (X_{t|t}^{(i1)}, Y_{t|t}^{(i1)}, W_{t|t}^{(i1)}, H_{t|t}^{(i1)}, 0.0, 1/M1).$$

The i4-th particle obtained in accordance with the predictive probability distribution data $S_{t|t-1}$ is used to obtain the first likelihood wp$^{(i4)}$ of 0.95. Based on the proportional distribution, four particles are sampled at the position of the i4-th particle obtained in accordance with the predictive probability distribution data $S_{t|t-1}$. More specifically, the i2-nd through i5-th particles obtained in accordance with the posterior probability distribution data $S_{t|t}$ are sampled; that is, four particles in total are sampled.

The second likelihood wn$^{(i4)}$=0.6 is then obtained from the i4-th particle obtained in accordance with the predictive probability distribution $S_{t|t-1}$. Thus, the internal variables wn$^{(i)}$ of the i2-nd through i5-th particles obtained in accordance with the posterior probability distribution $S_{t|t}$ are each set to the second likelihood wn=0.6, which is obtained by the likelihood obtaining unit 5. More specifically, the internal variables of the i2-nd through i5-th particles obtained in accordance with the posterior probability distribution data $S_{t|t}$ are set as follows:

$$(X_{t|t}^{(i)}, Y_{t|t}^{(i)}, W_{t|t}^{(i)}, H_{t|t}^{(i)}, wn_{t|t}^{(i)}, wp_{t|t}^{(i)}) = (X_{t|t-1}^{(i)}, Y_{t|t}^{(i)}, W_{t|t}^{(i)}, H_{t|t}^{(i)}, 0.6, 1/M1)$$

Note that i is one of i2 through i5.

The i5-th particle obtained in accordance with the predictive probability distribution data $S_{t|t-1}$ is used to obtain the first likelihood wp$^{(i5)}$ of 0.8. Based on the proportional distribution, three particles are sampled at the position of the i5-th particle obtained in accordance with the predictive probability distribution data $S_{t|t-1}$. More specifically, the i6-th through i8-th particles obtained in accordance with the posterior probability distribution data $S_{t|t}$ are sampled.

The second likelihood wn$^{(i5)}$=0.2 is then obtained from the i5-th particle obtained in accordance with the predictive probability distribution $S_{t|t-1}$. Thus, the internal variables wn$^{(i1)}$ of i6-th through i8-th particles obtained in accordance with the posterior probability distribution $S_{t|t}$ are each set to the second likelihood wn=0.2, which is obtained by the likelihood obtaining unit 5. More specifically, the internal variables of the i6-th through i8-th particles obtained in accordance with the posterior probability distribution data $S_{t|t}$ are set as follows:

$$(X_{t|t}^{(i)}, Y_{t|t}^{(i)}, W_{t|t}^{(i)}, H_{t|t}^{(i)}, wn_{t|t}^{(i)}, wp_{t|t}^{(i)}) = (X_{t|t}^{(i)}, Y_{t|t}^{(i)}, W_{t|t}^{(i)}, H_{t|t}^{(i1)}, 0.2, 1/M1)$$

Note that i is one of i6 through i8.

The i6-th particle obtained in accordance with the predictive probability distribution data $S_{t|t-1}$ is used to obtain the first likelihood wp$^{(i6)}$ of 0.25Based on the proportional distribution, one particle is sampled at the position of the i6-th particle obtained in accordance with the predictive probability distribution data $S_{t|t-1}$. More specifically, the i9-th particle obtained in accordance with the posterior probability distribution data $S_{t|t}$ is sampled.

The second likelihood wn$^{(i6)}$=0.0 is then obtained from the i6-th particle obtained in accordance with the predictive probability distribution $S_{t|t-1}$. Thus, the internal variable wn$^{(i9)}$ of i9-th particle obtained in accordance with the posterior probability distribution $S_{t|t}$ is set to the second likelihood wn=0.0, which is obtained by the likelihood obtaining unit 5. More specifically, the internal variables of the i9-th particle obtained in accordance with the posterior probability distribution data $S_{t|t}$ are set as follows:

$$(X_{t|t}^{(i9)}, Y_{t|t}^{(i9)}, W_{t|t}^{(i9)}, H_{t|t}^{(i9)}, wn_{t|t}^{(i9)}, wp_{t|t}^{(i9)}) = (X_{t|t}^{(i9)}, Y_{t|t}^{(i9)}, W_{t|t}^{(i9)}, H_{t|t}^{(i1)}, 0.0, 1/M1)$$

As described above, the posterior probability distribution estimation unit 6 samples M1 particles, at the ratio proportional to the first likelihood w2p$^{(i)}$ of the target object TG1 at time t, without changing the total number of the particles (the particle xa$_t^{(i)}$ (i-th particle of the object TG1) is sampled), and furthermore takes over the second likelihood wn with the sampled particles. In other words, the posterior probability distribution estimation unit 6 sets the second likelihood wn obtained by the likelihood obtaining unit 5 to the internal variable wn$^{(i)}$ of $S_{t|t}^{(i)}$.

When the number of particles to track the object TG1 is M1, it may be determined whether the process for tracking the target object is continued or stopped (Discard/Survive determination processing for the target object) based on the first likelihood wp$^{(i)}$.

For example, the posterior probability distribution estimation unit 6 performs determination processing as to whether the tracking processing for the object TG1 is continued or stopped as follows. In other words, the posterior probability distribution estimation unit 6 calculates a determination value DS by adding up M1 first likelihood values wp$^{(i)}$ obtained for the object TG1 using the following Formula 5.

Formula 5

$$DS = \sum_{i=1}^{M1} w_p^{(i)} \tag{5}$$

The posterior probability distribution estimation unit 6 then performs processing below.

(1) When the determination value DS is smaller than a threshold value th1, the posterior probability distribution estimation unit 6 stops the tracking processing for the object TG1; that is, the posterior probability distribution estimation unit 6 excludes the object TG1 from objects to be tracked from the subsequent time step on.

(2) When the determination value DS is greater than or equal to the threshold value th1, the posterior probability distribution estimation unit 6 continues the tracking processing for the object TG1; that is, the posterior probability distribution estimation unit 6 sets the object TG1 as one of objects to be tracked from the subsequent time step on.

For example, in the case of FIG. 2, when the threshold value th1 is set to "0.2", the following formula is satisfied:

$$DS=0.4+0.95+0.8+0.25=2.4$$

In this case, DS>0.2 is satisfied, and thus the posterior probability distribution estimation unit 6 continues to track the object TG1 from the subsequent time step on (continues processing for tracking the object TG1).

In the above, the value of the second likelihood wn obtained by the likelihood obtaining unit 5 is set (taken over) to the internal variable $wn^{(i)}$ of $s_{t|t}^{(i)}$; however, the present invention should not be limited to this. The value of the second likelihood wn may be taken over using a difference between or a ratio of the first likelihood value wp and the second likelihood value wn, which are obtained by the likelihood obtaining unit 5, as described below. More specifically, the posterior probability distribution estimation unit 6 may take over the second likelihood value wn using a difference between or a ratio of the first likelihood value wp and the second likelihood value wn, and then may set the internal variable $wn_{t|t}^{(i)}$ of i-th particle obtained in accordance with the posterior probability distribution data $S_4$, in the manner described in (1) and (2).

(1) Taking Over (Inheritance) Using a Ratio of the First Likelihood wp and the Second Likelihood wn $$wn_{t|t}^{(i)} = wp_{t|t}^{(i)} \times wn/wp$$
$$= (1/M1) \times wn/wp$$

For example, the first likelihood $wp^{(i4)}=0.95$ and the second likelihood $wn^{(i4)}=0.6$ are obtained from the i4-th particle obtained in accordance with the predictive probability distribution data $S_{t|t-1}$ in FIG. 7. Thus, based on the proportional distribution, particles at the position of the i4-th particle obtained in accordance with the predictive probability distribution data $S_{t|t-1}$ are sampled as described below; that is, internal variables $wn_{t|t}^{(i)}$ of i2-nd through i5-th particles obtained in accordance with the posterior probability distribution data $S_{t|t}$ are set, using the above-described formulas, as follows:

$$wn_{t|t}^{(i)} = wp_{t|t}^{(i)} \times wn/wp$$
$$= (1/M1) \times 0.65/0.95$$

Note that i is one of i2 through i5.

If wp=0 in the above formula, the data is divided by 0. To prevent this, the first likelihood wp that is smaller than a predetermined value th may be clipped to the value th. For example, if the first likelihood wp is smaller than a predetermined value 0.001, the first likelihood wp may be clipped to 0.001. This prevents the data from being divided by 0.

(2) Taking Over (Inheritance) Using a Difference Between the First Likelihood wp and the Second Likelihood wn $$wn_{t|t}^{(i)} = wp_{t|t}^{(i)} - (wp - wn)$$
$$= (1/M1) - (wp - wn)$$

For example, the first likelihood $wp^{(i4)}=0.95$ and the second likelihood $wn^{(i4)}=0.6$ are obtained from the i4-th particle obtained in accordance with the predictive probability distribution data $S_{t|t-1}$ in FIG. 7. Thus, based on the proportional distribution, particles at the position of the i4-th particle obtained in accordance with the predictive probability distribution data $S_{t|t-1}$ are sampled as described below; that is, internal variables $wn_{t|t}^{(i)}$ of i2-nd through i5-th particles obtained in accordance with the posterior probability distribution data $S_{t|t}$ are set, using the above-described formulas, as follows:

$$wn_{t|t}^{(i)} = wp_{t|t}^{(i)} - (wp - wn)$$
$$= (1/M1) - (0.95 - 0.6)$$

Note that i is one of i2 through i5.

Based on the distribution of the sampled M1 particles in the above processing, a set of samples (particles) $S_{t|t}$ generated in accordance with the posterior probability distribution $p(x_t|y_t)$ at time t is obtained such that $S_{t|t}=\{s_{t|t}^{(1)}, s_{t|t}^{(2)}, \ldots, s_{t|t}^{(M1)}\}$ is satisfied. The posterior probability distribution estimation unit 6 sets the internal variable $wn_{t|t}^{(i)}$ of i-th particle obtained in accordance with the posterior probability distribution data $S_{t|t}$ such that the value of the second likelihood wn is took over (inherited).

The posterior probability distribution estimation unit 6 then outputs the estimated (obtained) posterior probability distribution (posterior probability distribution data) from the state estimation apparatus 1000 and also outputs the estimated (obtained) posterior probability distribution (posterior probability distribution data) to the prior probability distribution output unit 7.

The posterior probability distribution estimation unit 6 may obtain, as resultant estimated data, vector data $(X_t^{(i)}, Y_t^{(i)}, W_t^{(i)}, H_t^{(i)})$ of a particle whose internal variable $wn_{t|t}^{(i)}$ is maximum among M1 particles obtained in accordance with the posterior probability distribution data $S_{t|t}$.

Alternatively, the posterior probability distribution estimation unit 6 may obtain resultant estimated data through processing below. The posterior probability distribution estimation unit 6 obtains, using the formula below, a weighted average value wgt of internal variables $wn_{t|t}^{(i)}$ of M1 particles obtained in accordance with the posterior probability distribution data $S_{t|t}$.

Formula 6

$$wgt = \frac{1}{M1}\sum_{i=1}^{M1} w_n^{(i)} \tag{6}$$

The posterior probability distribution estimation unit 6 may then obtain vector data $(wgt \times X_t^{(i)}, wgt \times Y_t^{(i)}, wgt \times W_t^{(i)}, wgt \times H_t^{(i)})$, which is obtained using the obtained weighted average value wgt, as resultant estimated data.

The prior probability distribution output unit 7 outputs the posterior probability distribution (posterior probability distribution data) at time t input from the posterior probability distribution estimation unit 6 to the prediction unit 9 at the next time t+1 as the prior probability distribution (prior probability distribution data).

Subsequently, the state estimation apparatus 1000 repeats the processing described above.

As described above, the state estimation apparatus 1000 obtains the posterior probability distribution (posterior probability distribution data) $S_{t|t}$ reflecting the first likelihood wp and the second likelihood wn. In other words, the state estimation apparatus 1000 obtains a plurality of pieces of observation data (possibility measurement data Dp and necessity measurement data Dn), and then estimates the internal state of the object using the plurality of likelihoods (first likelihood wp and second likelihood wn), which are each derived from the obtained plurality of pieces of observation data. This enables more accurate and robust detection and tracking of an object.

For example, as shown in FIG. 7, each particle obtained in accordance with the posterior probability distribution data $S_{t|t}$ has an internal variable $wn_{t|t}^{(i)}$ taking over (reflecting) a second likelihood value wn. Thus, determining the position of each particle and the internal variable taking over (reflecting) the second likelihood value wn achieves various tracking processing and detection processing using the particle (the posterior probability distribution data reflecting the first likelihood and the second likelihood).

In the first embodiment, the possibility measurement data Dp is data that is obtained by performing addition or OR operation using the first observation data D1 (observation data obtained by extracting image areas corresponding to persons) and the second observation data D2 (observation data obtained by extracting image areas corresponding to moving objects). Thus, a region including pixels with large data values of the possibility measurement data Dp (pixels with large pixel values) is likely to be a region corresponding to persons or moving objects. The first likelihood wp is derived from the possibility measurement data Dp, and then M1 particles are sampled at the ratio proportional to the first likelihood value wp. In other words, more particles are sampled (disposed) at portions with larger values of the first likelihood wp. Thus, regions with a large number of particles are likely to be regions corresponding to persons or moving objects.

In the first embodiment, the necessity measurement data Dn is data that is obtained by performing multiplication or AND operation using the first observation data D1 (observation data obtained by extracting image areas corresponding to persons) and the second observation data D2 (observation data obtained by extracting image areas corresponding to moving objects). Thus, a region including pixels with large data values of the necessity measurement data Dn (pixels with large pixel values) is likely to be a region corresponding to persons and furthermore moving objects. The second likelihood wn is derived from the necessity measurement data Dn, and thus a particle with a large value of the second likelihood wn is likely to be a particle that tracks objects that are persons and furthermore moving objects.

In other words, in the state estimation apparatus 1000, the first likelihood wp is reflected in the number of particles, and the second likelihood wn is reflected in the internal variable of each particle. Thus, determining the positions and number of particles and the internal variables taking over (reflecting) the second likelihood values wn of particles achieves various tracking processing and detection processing. In the first embodiment, a region where many particles are disposed is likely to be a region corresponding to a person (persons). Furthermore, determining the internal variable taking over (reflecting) the second likelihood values wn of a particle allows for determining whether the image region including the particle is likely to be an image region corresponding to a moving person (moving persons). In the state estimation apparatus 1000, the first likelihood wp is reflected in the number of particles, and the second likelihood wn is reflected in the internal variable of each particle. Thus, for example, it is determined that a region where many particles are disposed and the second likelihood values wn of the particles are large is likely to be a region corresponding to a moving person (moving persons). Thus, the state estimation apparatus 1000 performs processing for detecting and/or tracking various objects.

As described above, the state estimation apparatus 1000 obtains a plurality of pieces of observation data (possibility measurement data Dp and necessity measurement data Dn), and then estimates the internal state of the object using the plurality of likelihoods (first likelihood wp and second likelihood wn), which are each derived from the obtained plurality of pieces of observation data. This enables more accurate and robust detection and tracking of an object.

First Modification

A first modification of the first embodiment will now be described.

In the present modification, the components that are the same as in the above embodiments are given the same reference numerals as those components, and will not be described in detail.

Figure 8:
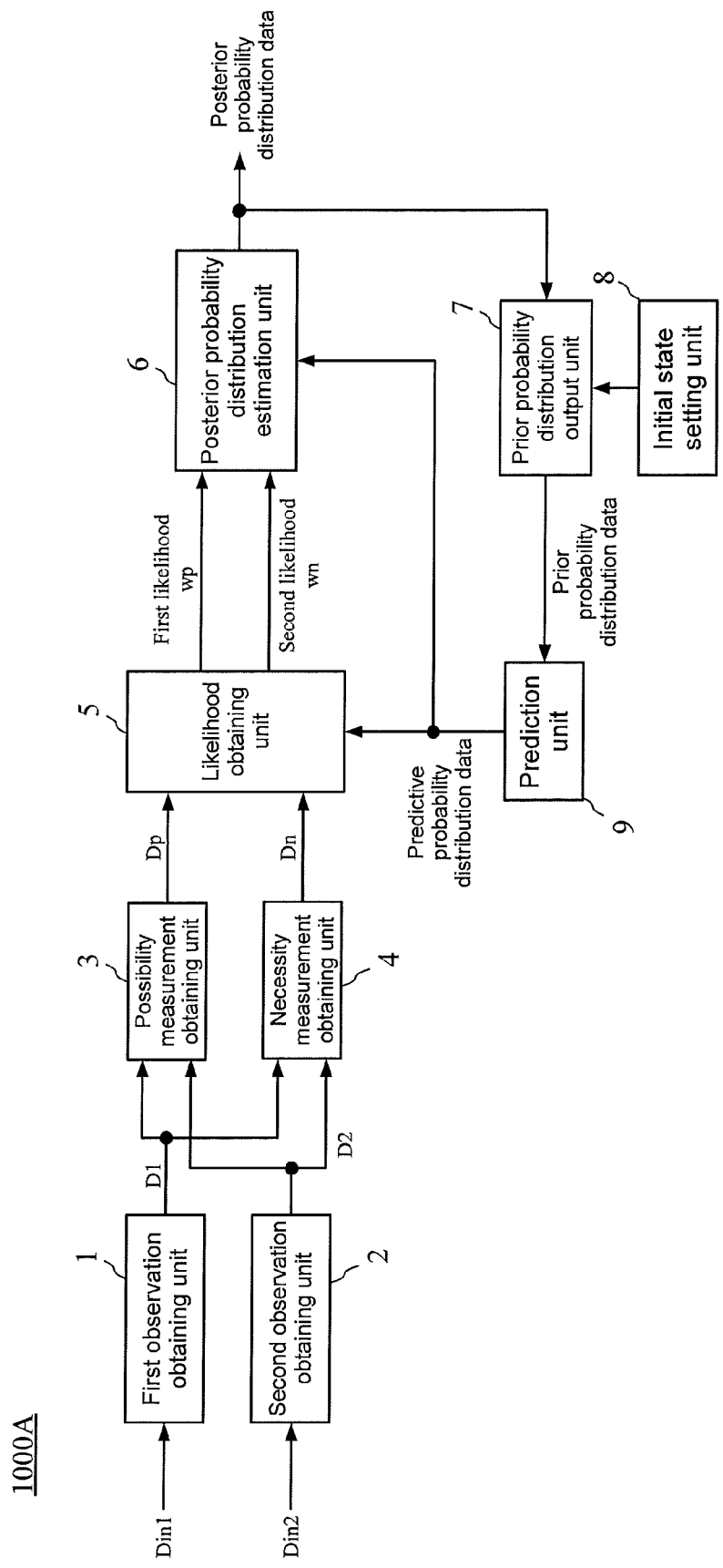
FIG. 8 is a schematic block diagram of a state estimation apparatus 1000A according to a first modification of the first embodiment.

FIG. 8 is a schematic block diagram of a state estimation apparatus 1000A according to the first modification of the first embodiment.

In the state estimation apparatus 1000A, a first input data Din1 is input to the first observation obtaining unit 1, and a second input data Din2 is input to the second observation obtaining unit 2. In the state estimation apparatus 1000 of the first embodiment, one input data Din is input to the first observation obtaining unit 1 and the second observation obtaining unit 2, whereas in the state estimation apparatus of the present modification, the data input to the first observation obtaining unit 1 differs from the data input to the second observation obtaining unit 2. In this regard, the state estimation apparatus 1000A of the present modification differs from the state estimation apparatus 1000 of the first embodiment.

In the state estimation apparatus 1000A of the present modification, the data input to the first observation obtaining unit 1 differs from the data input to the second observation obtaining unit 2. Thus, for example, a signal (data) Dint obtained by a first sensor (e.g., image sensor for visible light) (not shown) is input to the first observation obtaining unit 1, and a signal (data) Din2 obtained by a second sensor (e.g., image sensor for infrared light) (not shown) is input to the second observation obtaining unit 2. Through the above processing, the state estimation apparatus 1000A of the present modification obtains a plurality of pieces of observation data using a plurality of pieces of input data and estimates the internal state of an object using a plurality of likelihoods, each of which is derived from the plurality of pieces of observation data. This enables more accurate and robust detection and tracking of an object.

Second Modification

A second modification of the first embodiment will now be described.

In this modification, the components that are the same as in the first embodiment are given the same reference numerals as those components, and will not be described in detail.

Figure 9:
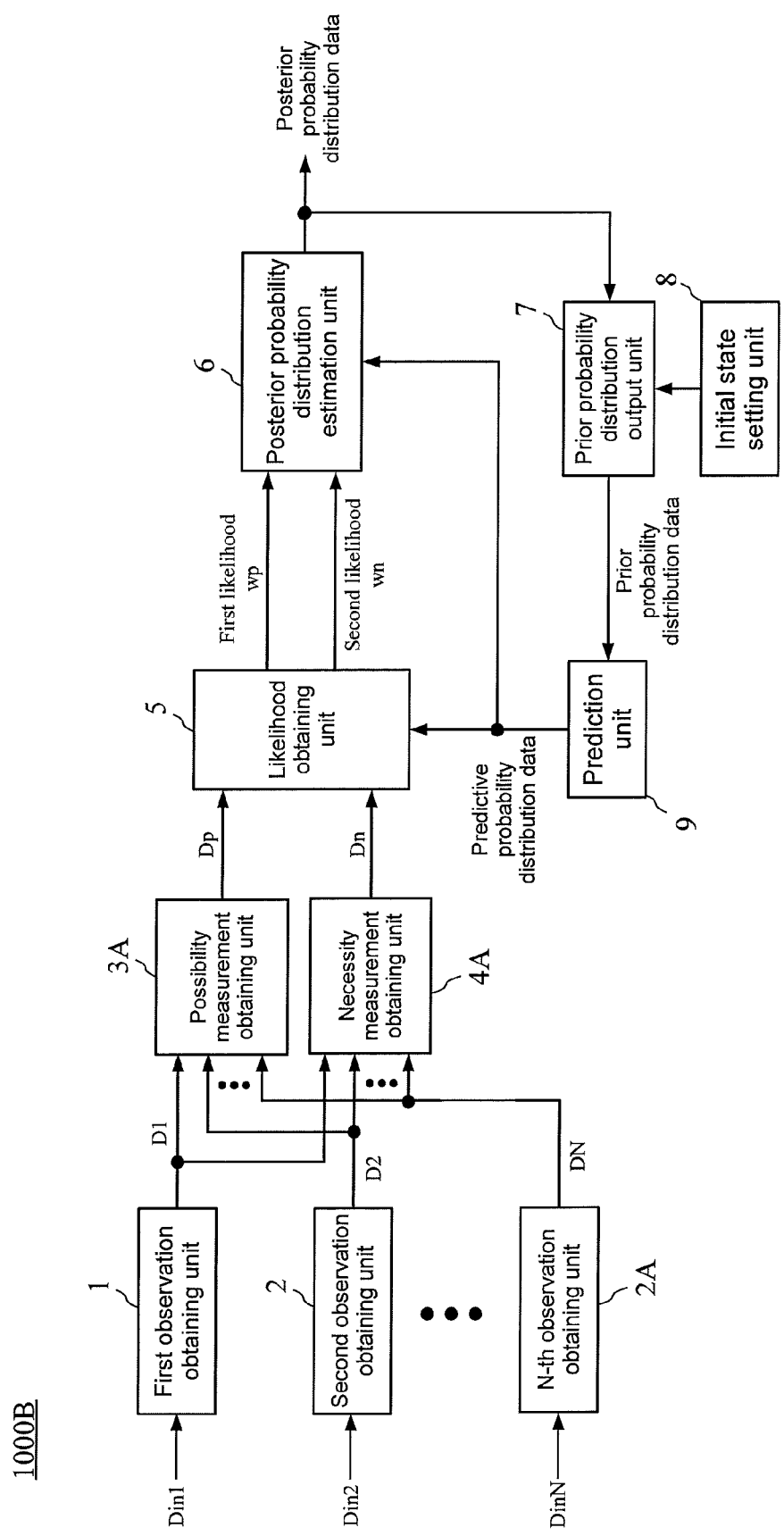
FIG. 9 is a schematic block diagram of a state estimation apparatus 1000B according to a second modification of the first embodiment.

FIG. 9 is a schematic block diagram of a state estimation apparatus 1000B according to the second modification of the first embodiment.

As shown in FIG. 9, the state estimation apparatus 1000B includes N (N is a natural number greater than or equal to three) observation obtaining units.

The state estimation apparatus 1000B according to this modification, as shown in FIG. 9, includes a possibility measurement obtaining unit 3A replacing the possibility measurement obtaining unit 3 of the state estimation apparatus 1000 of the first embodiment and a necessity measurement obtaining unit 4A replacing the necessity measurement obtaining unit 4 of the state estimation apparatus 1000 of the first embodiment.

The first observation obtaining unit 1 receives input data Din1 obtained by a first sensor (not shown) to obtain first observation data D1, which is data obtained by extracting a predetermined image feature quantity from the input data Din1. The first observation obtaining unit 1 then outputs the obtained first observation data D1 to the possibility measurement obtaining unit 3A and the necessity measurement obtaining unit 4A.

The second observation obtaining unit 2 receives input data Din2 obtained by a second sensor (not shown) to obtain second observation data D2, which is data obtained by extracting a predetermined image feature quantity from the input data Din2. The second observation obtaining unit 2 then outputs the obtained second observation data D2 to the possibility measurement obtaining unit 3A and the necessity measurement obtaining unit 4A.

The K-th (K is a natural number satisfying 3≤k≤N) observation obtaining unit receives input data DinK obtained by a K-th sensor (not shown) to obtain K-th observation data DK, which is data obtained by extracting a predetermined image feature quantity from the input data DinK. The K-th observation obtaining unit then outputs the obtained K-th observation data DK to the possibility measurement obtaining unit 3A and the necessity measurement obtaining unit 4A.

The possibility measurement obtaining unit 3A receives the N pieces of observation data, each of which is obtained by one of N observation obtaining units. The possibility measurement obtaining unit 3A obtains possibility measurement data Dp by performing addition or OR operation using two or more pieces (or all pieces) of observation data among the input N pieces of observation data in the same manner as in the first embodiment. The possibility measurement obtaining unit 3A then outputs the obtained possibility measurement data Dp to the likelihood obtaining unit 5.

The necessity measurement obtaining unit 4A receives the N pieces of observation data, each of which is obtained by one of N observation obtaining units. The necessity measurement obtaining unit 4A obtains necessity measurement data Dn by performing multiplication or AND operation using two or more pieces (or all pieces) of observation data among the input N pieces of observation data in the same manner as in the first embodiment. The necessity measurement obtaining unit 4A then outputs the obtained necessity measurement data Dn to the likelihood obtaining unit 5.

The subsequent processes are the same as in the first embodiment.

As described above, the state estimation apparatus 1000B of this modification, using a variety of input data, obtains a plurality of observation data, and estimates the internal state of an object using a plurality of likelihoods, each of which is derived from the plurality of pieces of observation data. This enables more accurate and robust detection and tracking of an object.

For example, suppose that the observation data obtained by the first observation obtaining unit 1 and the second observation obtaining unit 2 is the same as one in the first embodiment, and observation data obtained by the third observation obtaining unit is observation data for detecting an object with high temperature, which is obtained from input data obtained using an infrared image sensor. In this case, an image formed with the necessity measurement data Dn obtained from the above-described three pieces of observation data has pixels with large pixel values included in an image region corresponding to an object that is a person, a moving object, and an object with high temperature. The state estimation apparatus 1000B of this modification then obtains the second likelihood wn from the necessity measurement data Dn. Thus, detecting a region (image region) with a large number of particles whose second likelihood values wn are large based on the obtained posterior probability distribution data $S_{t|t}$ with the state estimation apparatus 1000B of this modification allows for appropriately detecting an object that is a person, a moving object, and an object with high temperature. This enables the state estimation apparatus 1000B of this modification to appropriately perform detection and tracking of an object that is a person, a moving object, and an object with high temperature, for example. In other words, the state estimation apparatus 1000B of this modification, using a variety of input data, obtains a plurality of observation data, and appropriately estimates the internal state of an object using a plurality of likelihoods, each of which is derived from the plurality of pieces of observation data, in a manner similar to in the first embodiment. This enables the state estimation apparatus 1000B of this modification to perform more accurate and robust detection and tracking of various objects.

In the state estimation apparatus 1000B, any two or more observation obtaining units may receive input data obtained by one sensor like the first modification.

Other Embodiments

The above embodiments and modifications may be combined to form state estimation apparatuses.

Although the above embodiments (including the modifications) describe a case in which there exists a likelihood obtaining unit 5, the present invention should not be limited to this structure. For example, a likelihood obtaining unit may be configured to include two divided units: a first likelihood obtaining unit for obtaining the first likelihood wp from the possibility measurement data Dp and a second likelihood obtaining unit for obtaining the second likelihood wn from the necessity measurement data Sn. In this case, when performing processing with a threshold value, the first likelihood obtaining unit and the second likelihood obtaining unit easily set threshold values independently.

In the above embodiments and modifications, the parameters used in obtaining the likelihoods includes the coordinate position $(X_t^{(i)}, Y_t^{(i)})$ of the i-th particle in the image and the width W and height H for defining a rectangular image region with the width W and the height H, the rectangular image region being centered on the coordinate position $(X_t^{(i)}, Y_t^{(i)})$ of the i-th particle. However, the present invention should not be limited to this case.

For example, the parameters used in obtaining the likelihoods may include parameters for defining a circle image region; that is, they may include the coordinate position $(X_t^{(i)}, Y_t^{(i)})$ of the i-th particle in the image and the radius R of the circle image region centered on the coordinate position $(X_t^{(i)}, Y_t^{(i)})$.

Alternatively, the parameters used in obtaining the likelihoods may include parameters for defining an elliptical image region; that is, they may include the coordinate position $(Xt^{(i)}, Yt^{(i)})$ of the i-th particle in the image and a value A (half the length of the major axis) and a value B (half the length of the minor axis) of the elliptical image region centered on the coordinate position $(Xt^{(i)}, Yt^{(i)})$. Furthermore, the angle θ formed by the major axis or the minor axis with respect to a predetermined direction may be added to the parameters used in obtaining the likelihoods.

Each block of the state estimation apparatus described in the above embodiment may be formed using a single chip with a semiconductor device, such as an LSI (large-scale integration) device, or some or all of the blocks of the state estimation apparatus may be formed using a single chip.

Although LSI is used as the semiconductor device technology, the technology may be an IC (integrated circuit), a system LSI, a super LSI, or an ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

All or part of the processes performed by the functional blocks described in the above embodiments may be implemented using programs. All or part of the processes performed by the functional blocks described in the above embodiments may be implemented by a central processing unit (CPU) in a computer. The programs for these processes may be stored in a storage device, such as a hard disk or a ROM, and may be executed from the ROM or be read into a RAM and then executed.

The processes described in the above embodiments may be implemented by using either hardware or software (including use of an operating system (OS), middleware, or a predetermined library), or may be implemented using both software and hardware.

The processes described in the above embodiments may not be performed in the order specified in the above embodiments. The order in which the processes are performed may be changed without departing from the scope and the spirit of the invention.

The present invention may also include a computer program enabling a computer to implement the method described in the above embodiments and a computer readable recording medium on which such a program is recorded. The computer readable recording medium may be, for example, a flexible disk, a hard disk, a CD-ROM, an MO, a DVD, a DVD-ROM, a DVD-RAM, a large-capacity DVD, a next-generation DVD, or a semiconductor memory.

The computer program may not be recorded on the recording medium but may be transmitted with an electric communication line, a radio or cable communication line, or a network such as the Internet. The term "unit" herein may include "circuitry," which may be partly or entirely implemented by using either hardware or software, or both hardware and software.

The specific structures described in the above embodiments are mere examples of the present invention, and may be changed and modified variously without departing from the scope and the spirit of the invention.

REFERENCE SIGNS LIST 1000, 1000A, 1000B state estimation apparatus
1 first observation obtaining unit
1 second observation obtaining unit
3, 3A possibility measurement obtaining unit
4, 4A necessity measurement obtaining unit
5 likelihood obtaining unit
6 posterior probability distribution estimation unit
7 prior probability distribution output unit
8 initial state setting unit
9 prediction unit

The invention claimed is:

1. A state estimation apparatus for estimating an internal state of an observation target, the apparatus comprising:
first observation obtaining circuitry configured to obtain first observation data from an observable event at predetermined time intervals;
second observation obtaining circuitry configured to obtain second observation data from the observable event at predetermined time intervals;
possibility measurement obtaining circuitry configured to obtain possibility measurement data by performing addition processing or logical OR processing with the first observation data and the second observation data;
necessity measurement obtaining circuitry configured to obtain necessity measurement data by performing multiplication processing or logical AND processing with the first observation data and the second observation data;
prediction circuitry configured to perform prediction using posterior probability distribution data, which is probability distribution, obtained at a preceding time t−1, of an internal state of the observation target to obtain predictive probability distribution data, which is probability distribution of an internal state of the observation target at a current time t;
likelihood obtaining circuitry configured to obtain a first likelihood based on the predictive probability distribution data and the possibility measurement data and to obtain a second likelihood based on the predictive probability distribution data and the necessity measurement data;
posterior probability distribution estimation circuitry configured to estimate, from the first likelihood and the predictive probability distribution data, posterior probability distribution data, which is probability distribution of the internal state of the observation target at the current time t; and
prior probability distribution output circuitry configured to output prior probability distribution data based on the posterior probability distribution data estimated by the posterior probability distribution estimation circuitry as prior probability distribution data at a next time t+1 in order to detect and track the observation target in a moving image.

2. The state estimation apparatus according to claim 1, wherein
the posterior probability distribution estimation circuitry sets an internal variable of a particle sampled in accordance with the posterior probability distribution at the current time t such that the internal variable includes a value set based on the second likelihood obtained by the likelihood obtaining circuitry.

3. The state estimation apparatus according to claim 2, wherein the posterior probability distribution estimation circuitry sets an internal variable of a particle sampled in accordance with the posterior probability distribution at the current time t such that the internal variable includes a value defined by $w_{t|t}^{(i)} = wn$, where $S_{t|t}$ is the posterior probability distribution data, $wn_{t|t}^{(i)}$ is an internal variable of an i-th particle obtained in accordance with the posterior probability distribution data $S_{t|t}$, wn is the second likelihood, corresponding to the particle, that is obtained by the likelihood obtaining circuitry.

4. The state estimation apparatus according to claim 2, wherein the posterior probability distribution estimation circuitry sets an internal variable of a particle sampled in accordance with the posterior probability distribution at the current time t such that the internal variable includes a value defined by $$wn_{t|t}^{(i)} = wp_{t|t}^{(i)} \times wn/wp$$
$$= (1/M1) \times wn/wp$$

where $S_{t|t}$ is the posterior probability distribution data, $wn_{t|t}^{(i)}$ is an internal variable of an i-th particle obtained in accordance with the posterior probability distribution data $S_{t|t}$, wp is the first likelihood, corresponding to the particle, that is obtained by the likelihood obtaining circuitry, wn is the second likelihood, corresponding to the particle, that is obtained by the likelihood obtaining circuitry, M1 (M1 is a natural number) is the number of particles sampled in accordance with the posterior probability distribution at the current time t, and $wp_{t|t}^{(i)}$ is an internal variable based on the first likelihood wp of the particle sampled in accordance with the posterior probability distribution at the current time t.

5. The state estimation apparatus according to claim 2, wherein the posterior probability distribution estimation circuitry sets an internal variable of a particle sampled in accordance with the posterior probability distribution at the current time t such that the internal variable includes a value defined by $$wn_{t|t}^{(i)} = wp_{t|t}^{(i)} - (wp - wn)$$
$$= (1/M1) - (wp - wn)$$

where $S_{t|t}$ is the posterior probability distribution data, $w_{t|t}^{(i)}$ is an internal variable of an i-th particle obtained in accordance with the posterior probability distribution data $S_{t|t}$, wp is the first likelihood, corresponding to the particle, that is obtained by the likelihood obtaining circuitry, wn is the second likelihood, corresponding to the particle, that is obtained by the likelihood obtaining circuitry, M1 (M1 is a natural number) is the number of particles sampled in accordance with the posterior probability distribution at the current time t, and $wp_{t|t}^{(i)}$ is an internal variable based on the first likelihood wp of the particle sampled in accordance with the posterior probability distribution at the current time t.

6. The state estimation apparatus according to claim 2, wherein the posterior probability distribution estimation circuitry sets an internal variable of a particle sampled in accordance with the posterior probability distribution at the current time t such that the internal variable includes a value, which is defined by a function of at least one variable of the three variables M1, wp, and wn, written as $$wn_{t|t}^{(i)} = \Phi(M1),$$
$$wn_{t|t}^{(i)} = \Phi(wp),$$
$$wn_{t|t}^{(i)} = \Phi(wn),$$
$$wn_{t|t}^{(i)} = \Phi(M1, wp),$$
$$wn_{t|t}^{(i)} = \Phi(M1, wn),$$
$$wn_{t|t}^{(i)} = \Phi(wp, wn), \text{ or }$$
$$wn_{t|t}^{(i)} = \Phi(M1, wp, wn),$$

where $S_{t|t}$ is the posterior probability distribution data, $w_{t|t}^{(i)}$ is an internal variable of an i-th particle obtained in accordance with the posterior probability distribution data $S_{t|t}$, wp is the first likelihood, corresponding to the particle, that is obtained by the likelihood obtaining circuitry, wn is the second likelihood, corresponding to the particle, that is obtained by the likelihood obtaining circuitry, M1 (M1 is a natural number) is the number of particles sampled in accordance with the posterior probability distribution at the current time t, and $wp_{t|t}^{(i)}$ is an internal variable based on the first likelihood wp of the particle sampled in accordance with the posterior probability distribution at the current time t.

7. The state estimation apparatus according to claim 2, wherein in performing processing for tracking an object, the posterior probability distribution estimation circuitry determines, based on the first likelihood wp, whether to continue to perform the processing for tracking the object or to stop the processing for tracking the object, where $S_{t|t}$ is the posterior probability distribution data, $wn_{t|t}^{(i)}$ is an internal variable of an i-th particle obtained in accordance with the posterior probability distribution data $S_{t|t}$, wp is the first likelihood, corresponding to the particle, that is obtained by the likelihood obtaining circuitry, wn is the second likelihood, corresponding to the particle, that is obtained by the likelihood obtaining circuitry, M1 (M1 is a natural number) is the number of particles sampled in accordance with the posterior probability distribution at the current time t, and $wp_{t|t}^{(i)}$ is an internal variable based on the first likelihood wp of the particle sampled in accordance with the posterior probability distribution at the current time t.

8. The state estimation apparatus according to claim 7, wherein the posterior probability distribution estimation circuitry obtains an integrated value sum using the formula below:

$$\text{sum} = \sum_{j=1}^{N1} w_p^{(j)} \quad \text{(c18)}$$

where $S_{t|t-1}$ is the predictive probability distribution data, and $wp^{(j)}$ is an internal variable of the first likelihood of j-th particle of N1 (N1 is a natural number) particles, which are obtained in accordance with the predictive probability distribution $S_{t|t-1}$ and are used for tracking the object, obtained by the likelihood obtaining circuitry, and (1) the posterior probability distribution estimation circuitry determines to stop the processing for tracking the object when the integrated value sum is less than a predetermined threshold value Th1, and (2) the posterior probability distribution estimation circuitry determines to continue to perform the processing for tracking the object when the integrated value sum is greater than or equal to the threshold value Th1.

9. The state estimation apparatus according to claim 7, wherein the posterior probability distribution estimation circuitry obtains a maximum value of internal variables $wp^{(j)}$ of N1 (N1 is a natural number) first likelihoods as a maximum value wp_max, where $S_{t|t-1}$ is the predictive probability distribution data, and $wp^{(j)}$ is an internal variable of the first likelihood of j-th particle of N1 particles, which are obtained in accordance with the predictive probability distribution $S_{t|t-1}$ and are used for tracking the object, obtained by the likelihood obtaining circuitry, and (1) the posterior probability distribution estimation circuitry determines to stop the processing for tracking the object when the maximum value wp_max is less than a predetermined threshold value Th2, and (2) the posterior probability distribution estimation circuitry determines to continue to perform the processing for tracking the object when the maximum value wp_max is greater than or equal to the threshold value Th2.

10. The state estimation apparatus according to claim 2, wherein in performing processing for tracking an object, the posterior probability distribution estimation circuitry obtains, based on the second likelihood wn, estimation resultant data for estimating an internal state of the object to be tracked, where $S_{t|t}$ is the posterior probability distribution data, $wn_{t|t}^{(i)}$ is an internal variable of an i-th particle obtained in accordance with the posterior probability distribution data $S_{t|t}$, wp is the first likelihood, corresponding to the particle, that is obtained by the likelihood obtaining circuitry, wn is the second likelihood, corresponding to the particle, that is obtained by the likelihood obtaining circuitry, M1 (M1 is a natural number) is the number of particles sampled in accordance with the posterior probability distribution at the current time t, and $wp_{t|t}^{(i)}$ is an internal variable based on the first likelihood wp of the particle sampled in accordance with the posterior probability distribution at the current time t.

11. The state estimation apparatus according to claim 10, wherein the posterior probability distribution estimation circuitry obtains, as the estimation resultant data, vector data $(X_t^{(i)}, Y_t^{(i)}, W_t^{(i)}, H_t^{(i)})$ of a particle whose internal variable $wn_{t|t}^{(i)}$ is maximum among M1 particles obtained in accordance with the posterior probability distribution data $S_{t|t}$, where $(X_t^{(i)}, Y_t^{(i)}, W_t^{(i)}, H_t^{(i)})$ is vector data for internal variables as to a position of the i-th particle obtained in accordance with the posterior probability distribution data $S_{t|t}$.

12. The state estimation apparatus according to claim 10, wherein the posterior probability distribution estimation circuitry obtains a weighted average value wgt of M1 internal variables $wn_{t|t}^{(i)}$ obtained in accordance with the posterior probability distribution data $S_{t|t}$ using formula below:

$$wgt = \frac{1}{M1} \sum_{i=1}^{M1} w_n^{(i)} \quad \text{(c112)}$$

where $(X_t^{(i)}, Y_t^{(i)}, W_t^{(i)}, H_t^{(i)})$ is vector data for internal variables as to a position of the i-th particle obtained in accordance with the posterior probability distribution data $S_{t|t}$, and the posterior probability distribution estimation circuitry obtains, as the estimation resultant data, vector data $(wgt \times X_t^{(i)}, wgt \times Y_t^{(i)}, wgt \times W_t^{(i)}, wgt \times H_t^{(i)})$ obtained using the weighted average value wgt.

13. A state estimation method for estimating an internal state of an observation target, the state estimation method comprising:

obtaining first observation data from an observable event at predetermined time intervals;

obtaining second observation data from the observable event at predetermined time intervals;

obtaining possibility measurement data by performing addition processing or logical OR processing with the first observation data and the second observation data;

obtaining necessity measurement data by performing multiplication processing or logical AND processing with the first observation data and the second observation data;

performing prediction using posterior probability distribution data, which is probability distribution, obtained at a preceding time t−1, of an internal state of the observation target to obtain predictive probability distribution data, which is probability distribution of an internal state of the observation target at a current t;

obtaining a first likelihood based on the predictive probability distribution data and the possibility measurement data and obtaining a second likelihood based on the predictive probability distribution data and the necessity measurement data;

estimating, from the first likelihood and the predictive probability distribution data, posterior probability distribution data, which is probability distribution of the internal state of the observation target at the current time t; and outputting prior probability distribution data based on the posterior probability distribution data estimated by the step of estimating posterior probability distribution data as prior probability distribution data at a next time t+1 in order to detect and track the observation target in a moving image.

14. An integrated circuit for estimating an internal state of an observation target, the integrated circuit comprising:

first observation obtaining circuitry configured to obtain first observation data from an observable event at predetermined time intervals;

second observation obtaining circuitry configured to obtain second observation data from the observable event at predetermined time intervals;

possibility measurement obtaining circuitry configured to obtain possibility measurement data by performing addition processing or logical OR processing with the first observation data and the second observation data;

necessity measurement obtaining circuitry configured to obtain necessity measurement data by performing multiplication processing or logical AND processing with the first observation data and the second observation data;

prediction circuitry configured to perform prediction using posterior probability distribution data, which is probability distribution, obtained at a preceding time t−1, of an internal state of the observation target to obtain predictive probability distribution data, which is probability distribution of an internal state of the observation target at a current time t;

likelihood obtaining circuitry configured to obtain a first likelihood based on the predictive probability distribution data and the possibility measurement data and to obtain a second likelihood based on the predictive probability distribution data and the necessity measurement data;

posterior probability distribution estimation circuitry configured to estimate, from the first likelihood and the predictive probability distribution data, posterior probability distribution data, which is probability distribution of the internal state of the observation target at the current time t; and prior probability distribution output circuitry configured to output prior probability distribution data based on the posterior probability distribution data estimated by the posterior probability distribution estimation circuitry as prior probability distribution data at a next time t+1 in order to detect and track the observation target in a moving image.

* * * * *